(12) United States Patent
Dunko et al.

(10) Patent No.: US 7,369,868 B2
(45) Date of Patent: May 6, 2008

(54) METHOD AND APPARATUS FOR SHARING CONTENT WITH A REMOTE DEVICE USING A WIRELESS NETWORK

(75) Inventors: Gregory A. Dunko, Cary, NC (US); Jonathan C. Lohr, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 498 days.

(21) Appl. No.: 10/283,631

(22) Filed: Oct. 30, 2002

(65) Prior Publication Data

US 2004/0087326 A1 May 6, 2004

(51) Int. Cl.
*H04B 7/00* (2006.01)
(52) U.S. Cl. .................... 455/517; 455/3.01; 455/3.03; 455/408
(58) Field of Classification Search ................ 709/227, 709/205, 220, 231; 455/3.03, 407–408, 517, 455/3.01, 466, 414.1
See application file for complete search history.

(56) References Cited

U.S. PATENT DOCUMENTS

| | | | | |
|---|---|---|---|---|
| 5,638,412 A | * | 6/1997 | Blakeney et al. | 375/377 |
| 5,944,793 A | * | 8/1999 | Islam et al. | 709/220 |
| 6,046,985 A | * | 4/2000 | Aldred et al. | 370/252 |
| 7,209,950 B2 | * | 4/2007 | Bennett et al. | 709/206 |
| 2002/0090934 A1 | * | 7/2002 | Mitchelmore | 455/412 |
| 2002/0156833 A1 | * | 10/2002 | Maurya et al. | 709/203 |
| 2002/0178279 A1 | * | 11/2002 | Janik et al. | 709/231 |
| 2004/0044774 A1 | * | 3/2004 | Mangalik et al. | 709/227 |
| 2004/0133848 A1 | * | 7/2004 | Hunt et al. | 715/500 |
| 2004/0203630 A1 | * | 10/2004 | Wang | 455/414.1 |
| 2004/0203944 A1 | * | 10/2004 | Huomo et al. | 455/466 |

FOREIGN PATENT DOCUMENTS

| | | |
|---|---|---|
| EP | 1 172 975 A1 | 1/2002 |
| WO | WO 98/26625 A2 | 6/1998 |
| WO | WO 00/65851 A2 | 11/2000 |
| WO | WO 00/67501 A1 | 11/2000 |
| WO | WO 01/69950 A1 | 9/2001 |

* cited by examiner

*Primary Examiner*—Tan Trinh
(74) *Attorney, Agent, or Firm*—Frederick D. Bailey; Charles L. Evans; Moore & Van Allen, PLLC

(57) ABSTRACT

The present invention is directed to a method and apparatus for sharing content between a content source device and a remote device. The content source device is connected to a mobile device that communicates with the remote device using a wireless network. The mobile device is used to facilitate the sharing of content with the remote device. The content shared with the remote device is formatted for its use by either the content source device or the mobile device. The present invention is directed to a wireless content sharing system that may include a content source device that supplies the content, a mobile device to facilitate the sharing of content, and a remote device to receive the content.

84 Claims, 19 Drawing Sheets

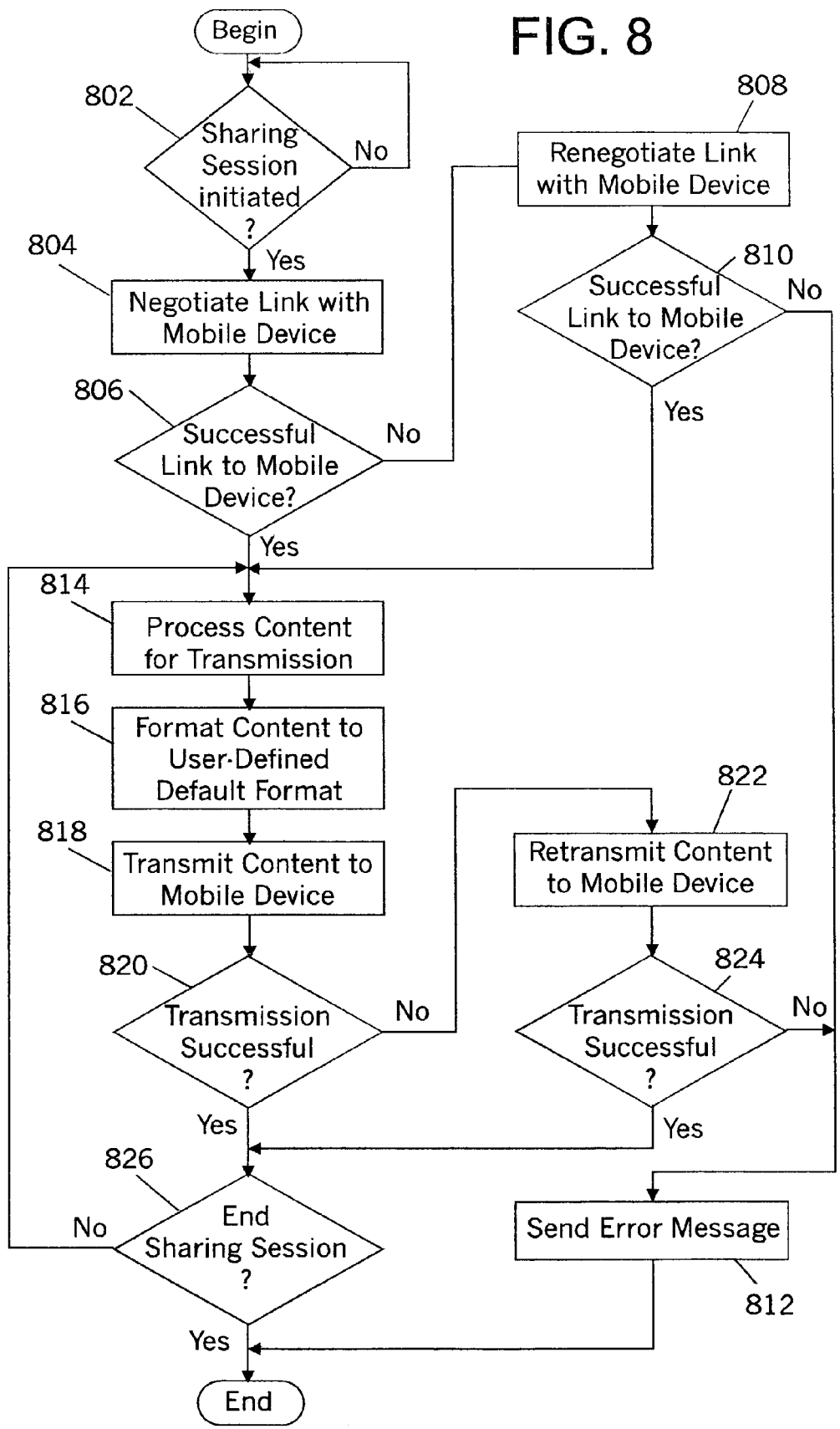

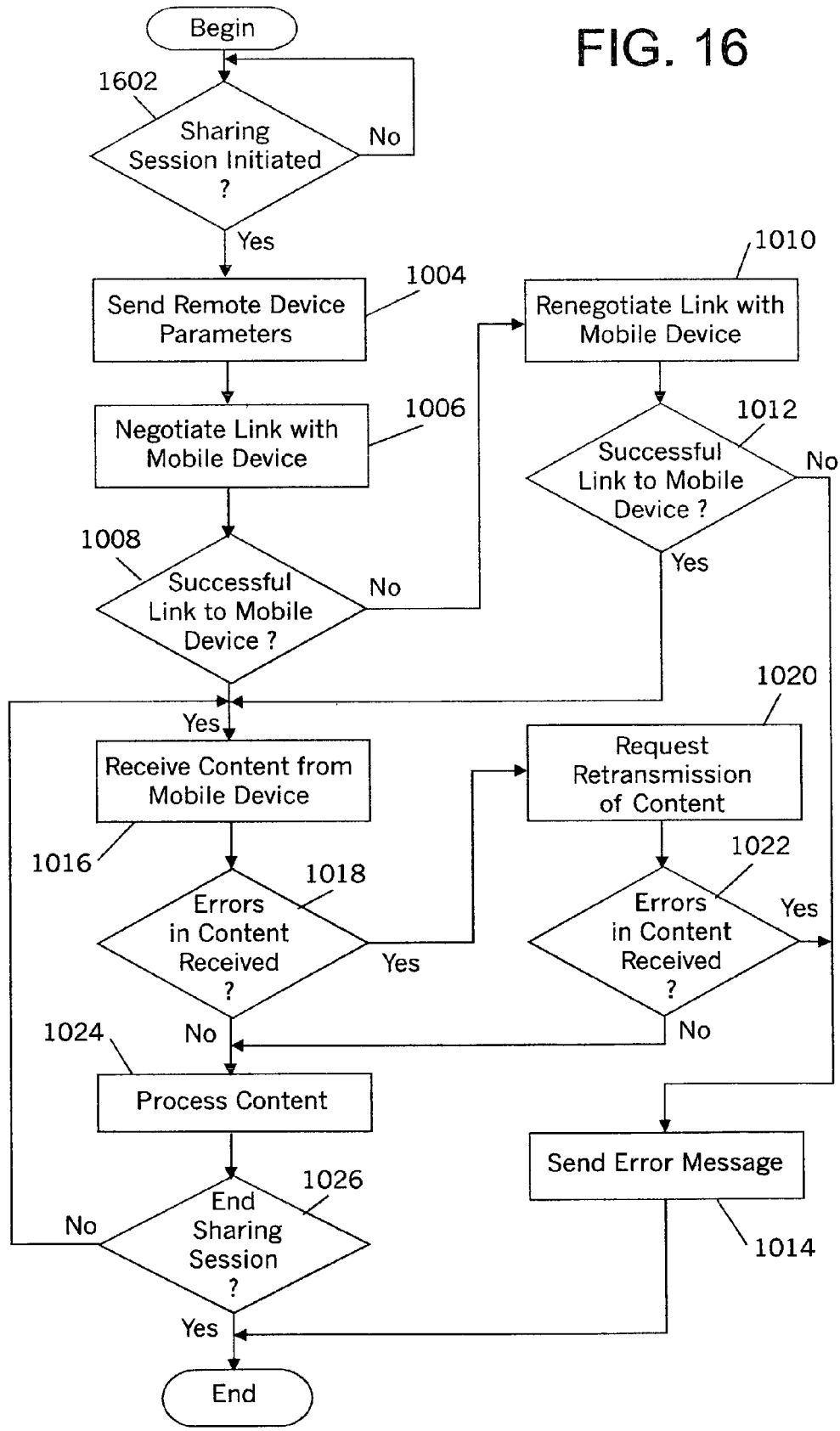

US 7,369,868 B2

METHOD AND APPARATUS FOR SHARING CONTENT WITH A REMOTE DEVICE USING A WIRELESS NETWORK

BACKGROUND

Wireless communications devices are continually evolving toward higher data rates. While the basis until recently has been approximately 9.6 Kbps for circuit switched connections, the rates are increasing rapidly. Packet switched connections such as Global Packet Radio Service (GPRS) can lead to 28.8 Kbps or higher. With newer technologies such as Enhanced Data rates for Global Evolution (EDGE) and the Universal Mobile Telecommunications System (UMTS) data rates will evolve through 384 Kbps and continue upwards.

With these higher data rates, it becomes possible using wireless communications devices to send and receive many types of content such as web pages, images, music, voice, text, graphics, software, audio, video, or multimedia. The concept of a wireless Internet becomes attractive as does streaming audio, video, multimedia, and other information with these higher data rate equipped communications devices.

What is needed is a method and apparatus that will allow a user having a wireless communications device to take advantage of these higher data rates to share content located on a device such as a personal computer or laptop with another user having a wireless communications device.

SUMMARY

The present invention is directed to a method and apparatus for sharing content between a content source device and a remote device. The content source device is connected to a mobile device that communicates with the remote device using a wireless network. The mobile device is used to facilitate the sharing of content with the remote device. The content shared with the remote device is formatted for its use by either the content source device or the mobile device. The present invention is directed to a wireless content sharing system that may include a content source device that supplies the content, a mobile device to facilitate the sharing of content, and a remote device to receive the content.

The mobile device activates a content sharing session with a content source device and a remote device. The mobile device then receives content from the content source device, formats that content for use by the remote device, and then transmits the content to the remote device using a wireless network. Alternatively, the content may be formatted by the content source device prior to being sent to the mobile device. The remote device activates a content sharing session with the mobile device. The remote device then receives the content formatted for its use from the content source device via the mobile device using a wireless network. The content source device initiates a content sharing session with the mobile device. The content source device then formats the content available so that a generic remote device may use the content before transmitting the content to the mobile device.

BRIEF DESCRIPTION OF THE DRAWINGS

FIG. 8 is a flowchart diagram illustrating one embodiment of the content source device process for performing the present invention.

FIG. 16 is a flowchart diagram illustrating another embodiment of the remote device process for performing the present invention.

DESCRIPTION OF THE INVENTION

Figure 1:
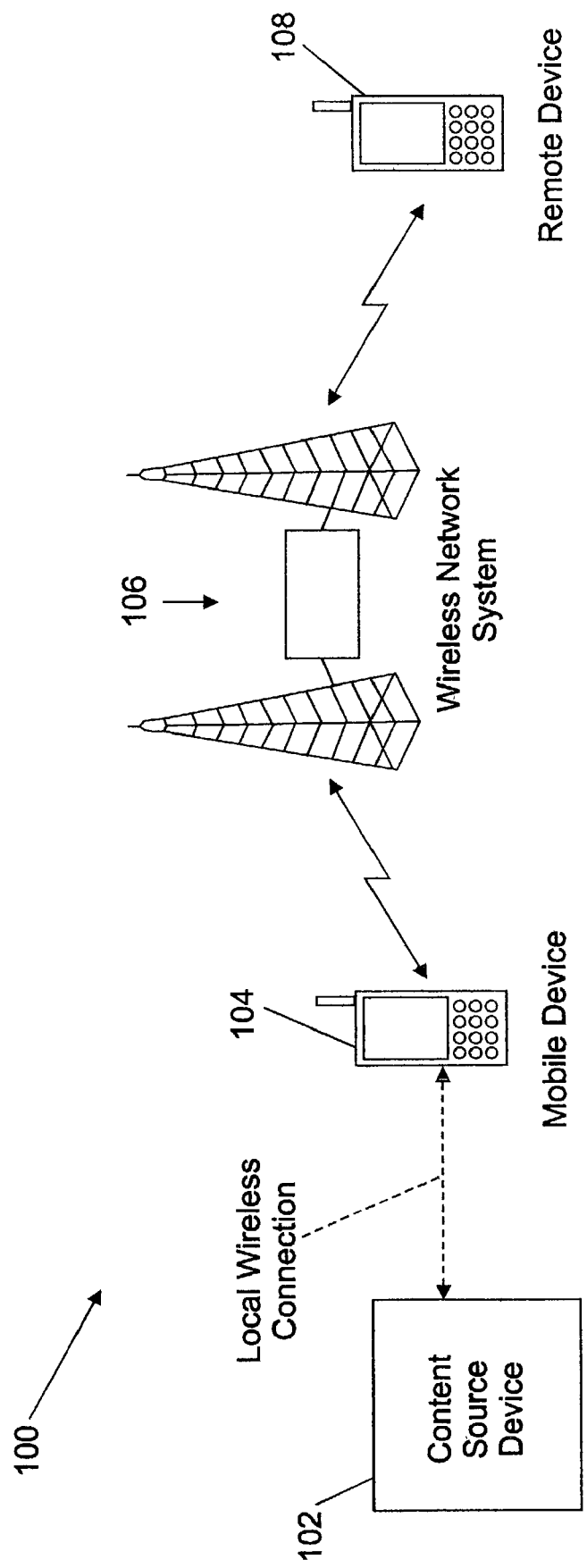
FIG. 1 is an example of a typical configuration of devices in a wireless content sharing system in accordance with an embodiment of the present invention.

It is to be understood that the present invention is not limited to the example embodiments disclosed herein. FIG. 1 is an example of a typical configuration of devices in a wireless content sharing system in accordance with one embodiment of the present invention. A wireless content sharing system 100 may include a content source device 102, a mobile device 104, a wireless network system 106, and a remote device 108. As disclosed herein, the wireless content sharing system 100 allows a user of mobile device 104 to share the content available on content source device 102 with the user of remote device 108 via the wireless network system 106.

The mobile device 104 may be any type of communications device capable of transmitting and receiving signals over a wireless network system 106. This may include traditional devices such as cellular telephones, personal communications systems, personal data assistants, conventional laptops, palmtop computers, or other similar devices that include a radiotelephone transceiver. The mobile device 104 communicates with remote device 108 over the wireless network system 106. The wireless network 106 may be any type of communications system such as a wireless system that operates according to the Global System for Mobile (GSM) standards and is capable of sending and receiving data packets using the General Packet Radio Service (GPRS) or using Wideband-Code Division Multiple Access (W-CDMA). The remote device 108 has similar capabilities to mobile device 104 and may also include any number of traditional or other devices as described above.

Mobile device 104 is connected to the content source device 102. The devices 102 and 104 may be connected using any number of wired or wireless methods. For example, the two devices may have a wired connection using a serial cable (RS-232) or using a Universal Serial Bus (USB) cable, or they may have a wireless connection such as a short range, wireless Bluetooth or IrDA connection. For the purpose of illustration, content source device 102 and mobile device 104 are connected in this embodiment and communicate using a Bluetooth wireless connection, as is understood in the art. Content source device 102 may be any type of device capable of producing, generating, or storing content and transmitting that content to mobile device 104 such as personal computers, laptops, video cameras, game consoles, and music kiosks. The content may be any type of information or data capable of being produced or generated such as web pages, images, music, voice, text, graphics, software, audio, video, or multimedia.

While the embodiments described herein primarily illustrate content from the content source device being transmitted in one direction to the remote device, as one of ordinary skill in the telecommunications and computing arts would quickly recognize, each device (the content source device, mobile device, and remote device) may produce, generate, and/or store content that may be transmitted to any of the other devices in the wireless content sharing system. Therefore, in addition to content being transmitted by the content source device, one embodiment of the invention may include "mobile device-generated content" and/or "remote device-generated content" that may be transmitted and received by and between the various devices in the wireless content sharing system enabling users of the devices to engage in a fully interactive content sharing experience.

The invention as described herein may be implemented in the content source device 102, the mobile device 104, and the remote device 108 using application software that contains a series of instructions for the devices to perform particular tasks. Each of the devices in combination with the instructions form the means to carry out the invention.

Figure 2:
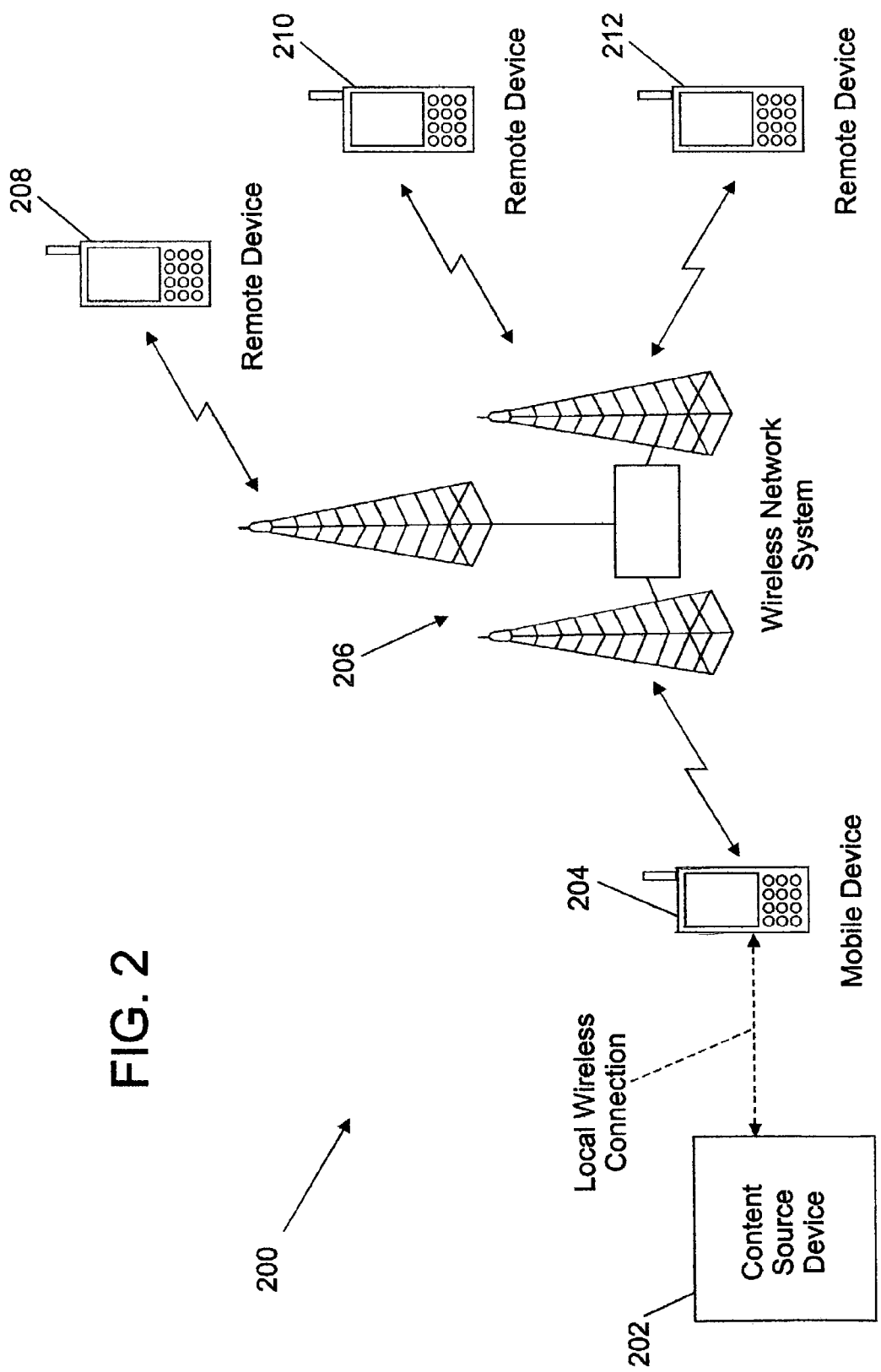
FIG. 2 illustrates a wireless content sharing system having multiple remote devices according to one embodiment of the present invention.

FIG. 2 illustrates a wireless content sharing system having multiple remote devices according to one embodiment of the present invention. The wireless content sharing system 200 shown in FIG. 2 is similar to the embodiment shown in FIG. 1; however, the wireless content sharing system 200 demonstrates that the user of mobile device 204 may share the content from content source device 202 with more than one remote device. As shown in FIG. 2, the content may be transmitted by mobile device 204 over the wireless network system 206 to remote devices 208, 210, and 212. While it is not shown in FIG. 1 or FIG. 2, it would be easily understood by one skilled in the art that the wireless content sharing systems 100 and 200 of the present invention may also include the use of multiple content source devices that each transmit content to the mobile device.

Figure 3:
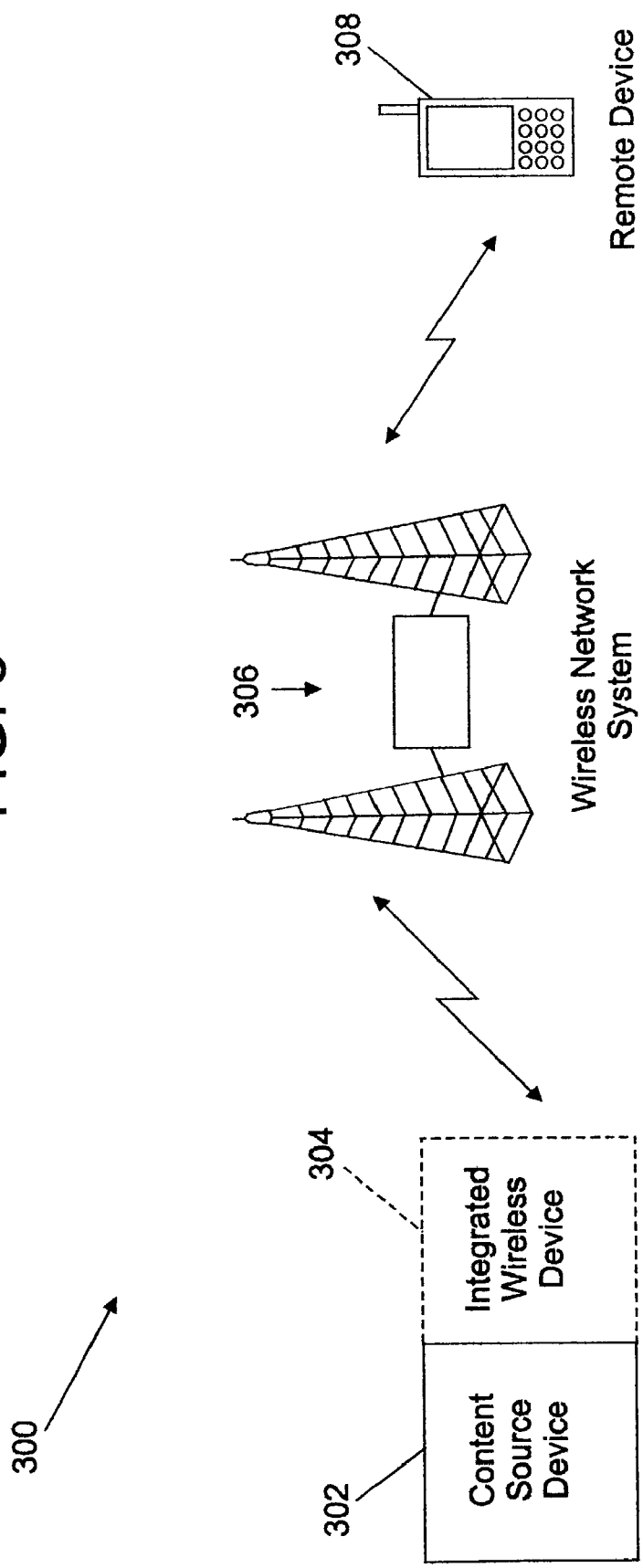
FIG. 3 illustrates a wireless content sharing system having a content source device with a wireless device integrated into the content source device according to one embodiment of the present invention.

FIG. 3 illustrates a wireless content sharing system having a content source device with a wireless device integrated into the content source device according to one embodiment of the present invention. The wireless content sharing system 300 shown in FIG. 3 is similar to the embodiment shown in FIG. 1. The wireless content sharing system 300 includes a content source device 302 having an integrated wireless device 304 built into the content source device that is capable of transmitting and receiving signals over a wireless network system 306 to communicate with remote device 308.

Figure 4:
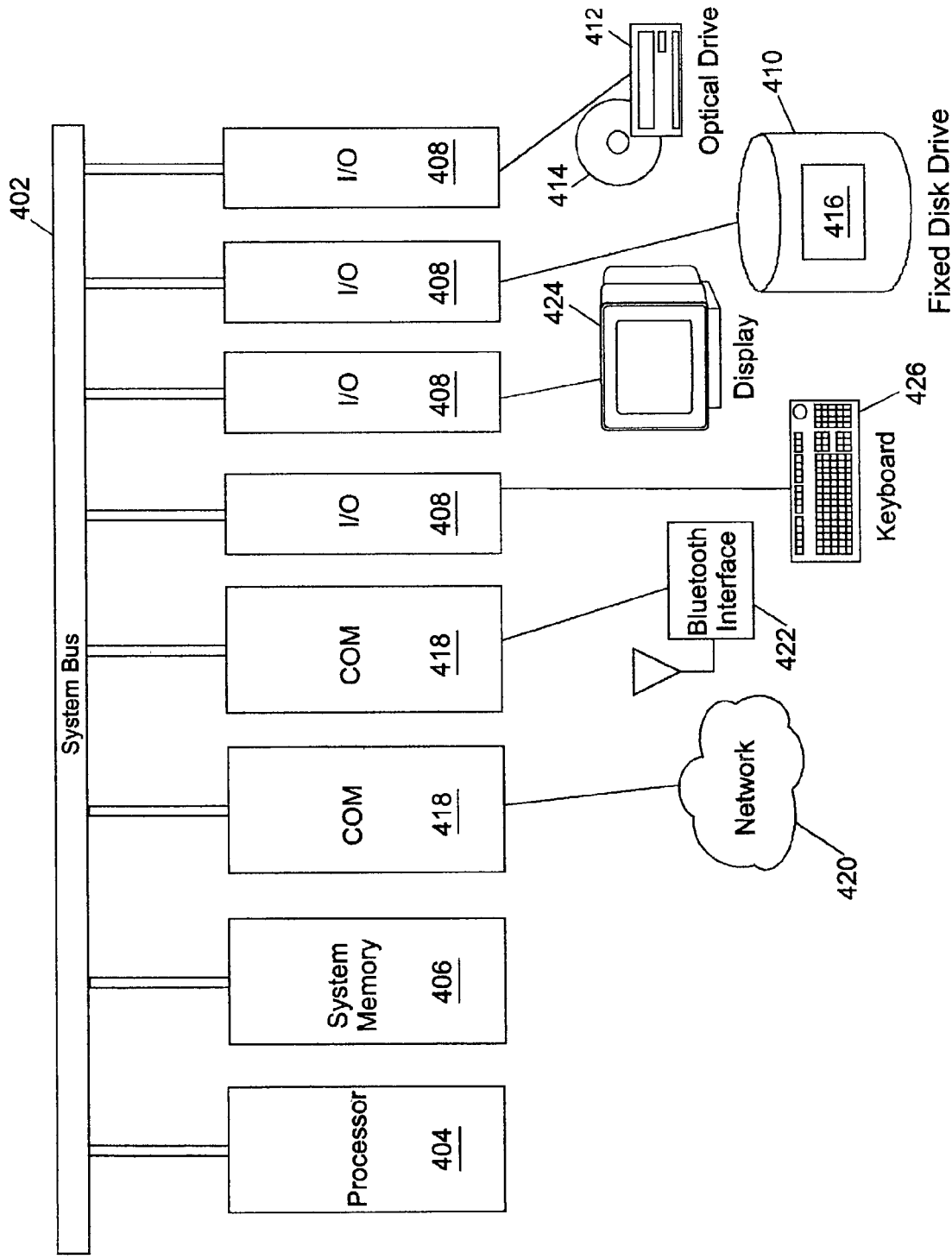
FIG. 4 illustrates a content source device in the form of a personal computer system programmed with application software to implement the wireless content sharing system according to one embodiment of the present invention.

FIG. 4 illustrates a content source device in the form of a personal computer system programmed with application software to implement the wireless content sharing system according to one embodiment of the present invention. System bus 402 interconnects the major components. The system is controlled by processor 404, which serves as the central processing unit (CPU) for the system. System memory 406 is typically divided into multiple types of memory or memory areas such as read-only memory (ROM), and random access memory (RAM). A plurality of standard input/output (I/O) adapters or devices, 408, are present. A typical system can have any number of such devices; only four are shown for clarity. These connect to various devices including a fixed disk drive, 410, and a removable media optical drive, 412. This drive accepts writable and read-only optical disks such as compact discs (CD's) and digital versatile discs (DVD's) as shown at 414.

The application software instructions for implementing various functions, 416, including the wireless content sharing, are stored on the fixed disc 410. When the system is operating, the instructions are partially loaded into memory 406 and executed by processor 404. The processor 404 and memory 406 that controls the overall operation of the device may be together referred to herein as the "processing platform" of the content source device. Some aspects of the invention are implemented in some embodiments by the application software controlling the hardware. Content may be read and written to and from the fixed disc 410 or the optical disc 414 when inserted into the optical drive 412.

Additional I/O devices have specific functions. A personal computer system implementing all or a portion of the invention may contain I/O devices in the form of communications (COM) adapters, 418, to connect to a network, 420, or to a short range, wireless Bluetooth interface 422. The network or Bluetooth interface can be used to transfer software implementing the invention, or to share content with a remote device user. A display, 424, is also connected, as well as a keyboard, 426. The keyboard 426 that receives user input may be referred to herein as the "user interface" of the content source device. Any of these adapters should be thought of as functional elements more so than discrete pieces of hardware. A personal computer system could have all or some of the adapter entities implemented on one circuit board.

It should be noted that the system of FIG. 4 is meant as an example only. Numerous types of general-purpose computer systems and other similar devices are available and can be used. Available systems may include those that run operating systems such as Windows™ by Microsoft, various versions of UNIX™, various versions of LINUX™, and various versions of Apple's Mac™ OS.

The application software elements of the invention may be embodied in hardware and/or in software (including firmware, resident software, micro-code, etc.). As shown above, the invention may take the form of application software, which may be embodied by a computer-usable or computer-readable storage medium having computer-usable or computer-readable, instructions or "code" embodied in the medium for use by or in connection with the device. Such mediums are pictured in FIG. 4 to represent the optical disc and the fixed disc. In the context of this document, a computer-usable or computer-readable medium may be any medium that can contain, store, communicate, propagate, or transport the software for use by or in connection with the apparatus or device. The computer-usable or computer-readable medium may be, for example but is not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the software is printed, as the software can be electronically captured, via, for instance, optical scanning of the paper or other medium, then compiled, interpreted, or otherwise processed in a suitable manner. The application software and the hardware described in FIG. 4 form the various means for carrying out the functions in some of the example embodiments.

Figure 5:
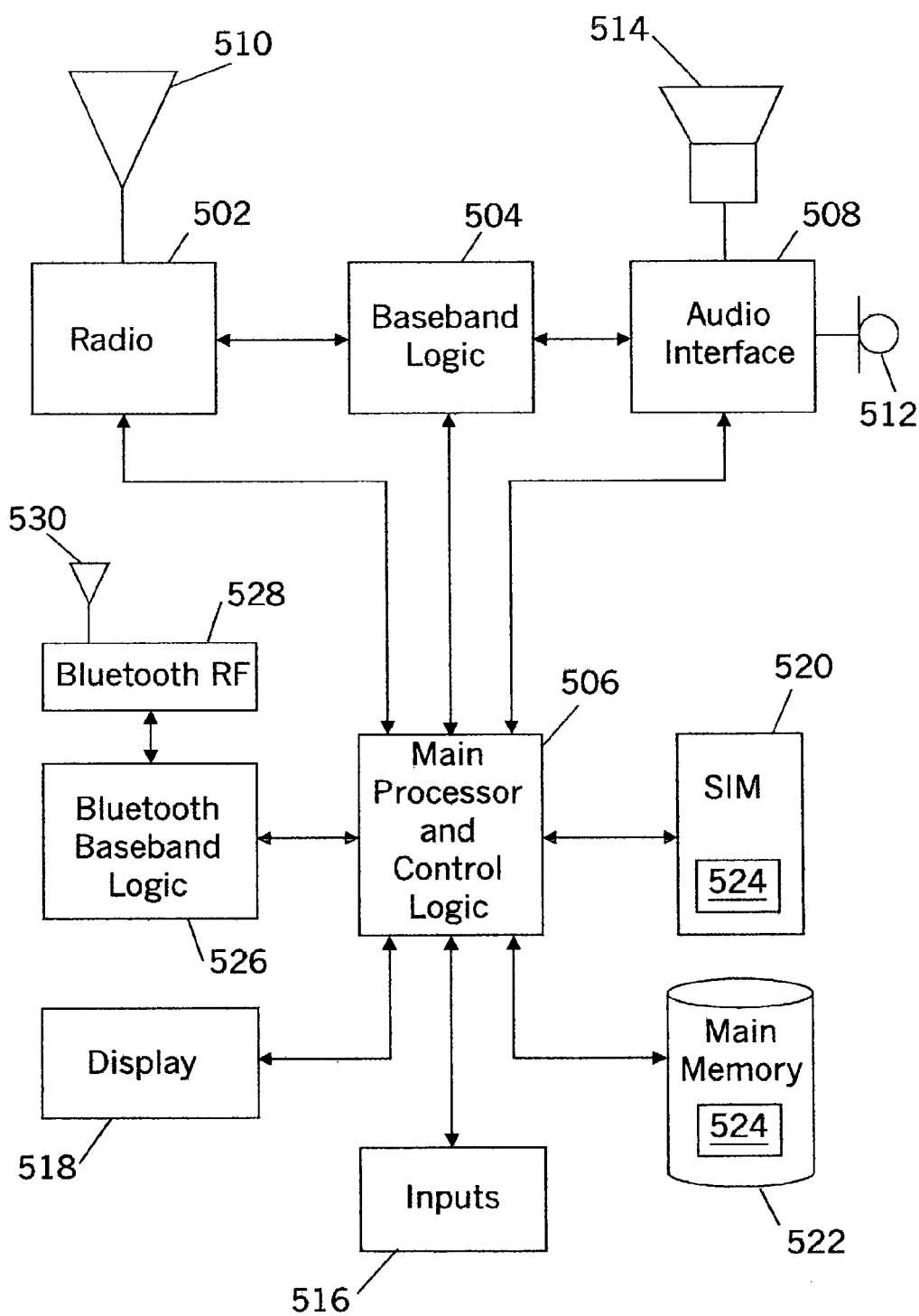
FIG. 5 is a block diagram of a mobile device or a remote device in the form of a mobile communications device programmed with application software to implement the wireless content sharing system according to one embodiment of the present invention.

FIG. 5 is a block diagram of a mobile device or a remote device in the form of a mobile communications device programmed with application software to implement the wireless content sharing system according to one embodiment of the present invention. This illustration provides an example of a mobile device 104 or a remote device 108 (as shown in FIG. 1). The invention will work equally well with other types of communications devices that are capable of transmitting and receiving signals over a wireless network system.

As shown in FIG. 5, the mobile communications device includes a radio block, 502, a baseband logic block, 504, a main processor and control logic block, 506, and an audio interface block, 508. Within radio block 502, the information received and transmitted is converted from and to the radio frequencies (RF) of the various carrier types, and is filtered using baseband or intermediate frequency circuitry, as is understood in the art. The device's antenna system, 510, is connected to radio block 502. In baseband logic block 504, basic signal processing occurs, e.g., synchronization, channel coding, decoding and burst formatting, as is understood in the art. Audio interface block 508 handles voice as well as analog-to-digital (A/D) and digital-to-analog (D/A) processing. It also receives input through microphone 512, and produces output through speaker 514.

The mobile communications device may include the ability to transmit and receive short range, wireless signals using the Bluetooth baseband logic block, 526, and the Bluetooth RF block, 528. Within the Bluetooth RF block 528, the information received and transmitted is converted from and to radio frequencies (RF) using Bluetooth standards, as is understood in the art. The short range antenna, 530, is connected to the Bluetooth RF block 528. In Bluetooth baseband logic block 526, basic signal processing occurs, e.g., synchronization, channel coding, decoding and burst formatting, as is understood in the art.

The main processor and control logic block 506 coordinates the aforementioned blocks and also plays an important role in controlling the inputs, 516, such as a key pad, and the display, 518, such as a liquid crystal display (LCD). The microphone 512, speaker 514, inputs 516, and display 518 that receive user input and provide information may be together or separately referred to herein as the "user interface" of the mobile or remote device. The main processor and control logic block 506 also directs and controls the functions of the aforementioned transceiving blocks using one or more microprocessors or digital signal processors. A subscriber identity module (SIM), 520, may be included and is shown as operatively connected to the main processor and control logic block. Also included is the main memory 522. The application software and instructions, 524, necessary to implement the invention may be stored in SIM 520 or main memory, 522, and it controls the operation of the device through the main processor and control block 506. The processor and memory that controls the overall operation of the device may be together referred to herein as the "processing platform" of the mobile or remote device. Some aspects of the invention are implemented in some embodiments by the application software controlling the hardware. The interconnection between the main processor, control logic, memory, and SIM are depicted schematically only for clarity, but is often an internal bus.

Figure 6:
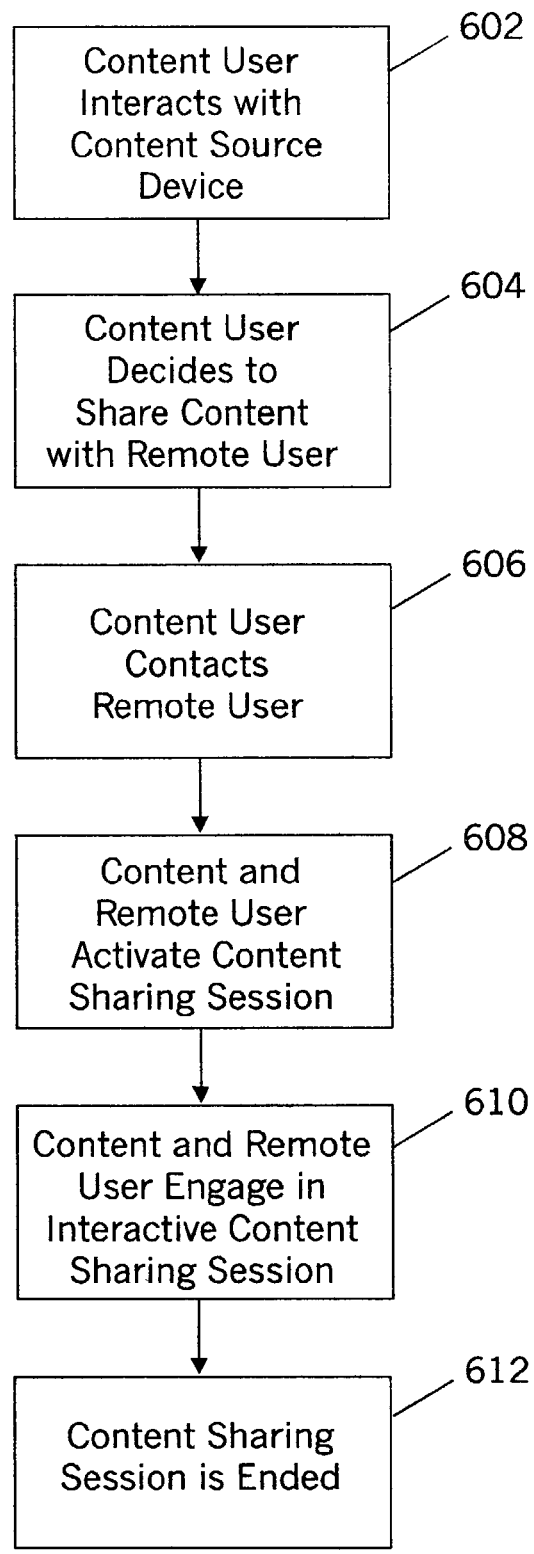
FIG. 6 provides a block diagram illustrating one embodiment of a content sharing session between two users.

As one example of the wireless content sharing system described herein, FIG. 6 provides a block diagram illustrating one embodiment of a content sharing session between two users. Initially, the content user is interacting with a content source device, 602. The content user decides that he or she would like to share the content on their content source device with a remote user, 604. The content user contacts the remote user, 606, and both users activate a content sharing session using the invention as is disclosed herein, 608. The content and remote users engage in an interactive content sharing session, 610, until the session is ended, 612.

As a practical example of the above process, a content user may be playing a new video game on his or her gaming device. The content user may have a friend that is an "expert" at this game and wants to get some advice and/or coaching. The content user establishes a connection between the content user's wireless device and the content user's gaming device. The content user then contacts the friend using the content user's wireless device. The content user and the friend active a content sharing session. Using a Bluetooth connection between the gaming device and the content user's wireless device, the visual and audio attributes of the game are sent from the gaming device to the content user's wireless device and then on to the friend's wireless device. At all times during the content sharing session, in addition to sharing content, the content user and the friend may communicate with each other using a standard audio link. The net result of the process is that the remote user can see "where" the content user is in the game and the two users can also communicate with each other ("I can see that you are at Level 12 in the underground river"). The two users can discuss the situation and the remote user can provide feedback such as "You need more of those power cells there on the left". The content user acts according to the information and content user's actions are relayed to the remote user. In this way, the two users share the game experience.

As another example of the process described in FIG. 6, a content user with a GSM/GPRS wireless device wishes to share a song with a friend that the user is listening to in a local music store. The music store has a kiosk with ports that enable content user to plug their wireless device into the kiosk to share songs with others. The content user calls the friend, who also has a GSM/GPRS wireless device, and then activates a content sharing session with the friend. The song is then sent from the kiosk to the content user's wireless device where it is formatted into an MP3 format. The song is then sent to the friend's wireless device using the device's GPRS link. During the whole process, the content user and the friend are also able to communicate over the GSM link. The GSM voice and GPRS transported MP3 audio are received and then "mixed" in the friend's wireless device, so that the friend can listen to the song and participate in the conversation. The experience would be as close as possible to being in the same room and listening to the song together.

While the embodiments described herein primarily illustrate content being transmitted in one direction from the content source device to the remote device, as one of ordinary skill in the telecommunications and computing arts would quickly recognize, content and other instructions may be transmitted both to and from the various devices to enable the sharing of content between the device users thus enabling the users to engage in a fully interactive content sharing experience. As stated previously, it is to be understood that the present invention is not limited to the example embodiments disclosed herein.

Figure 7:
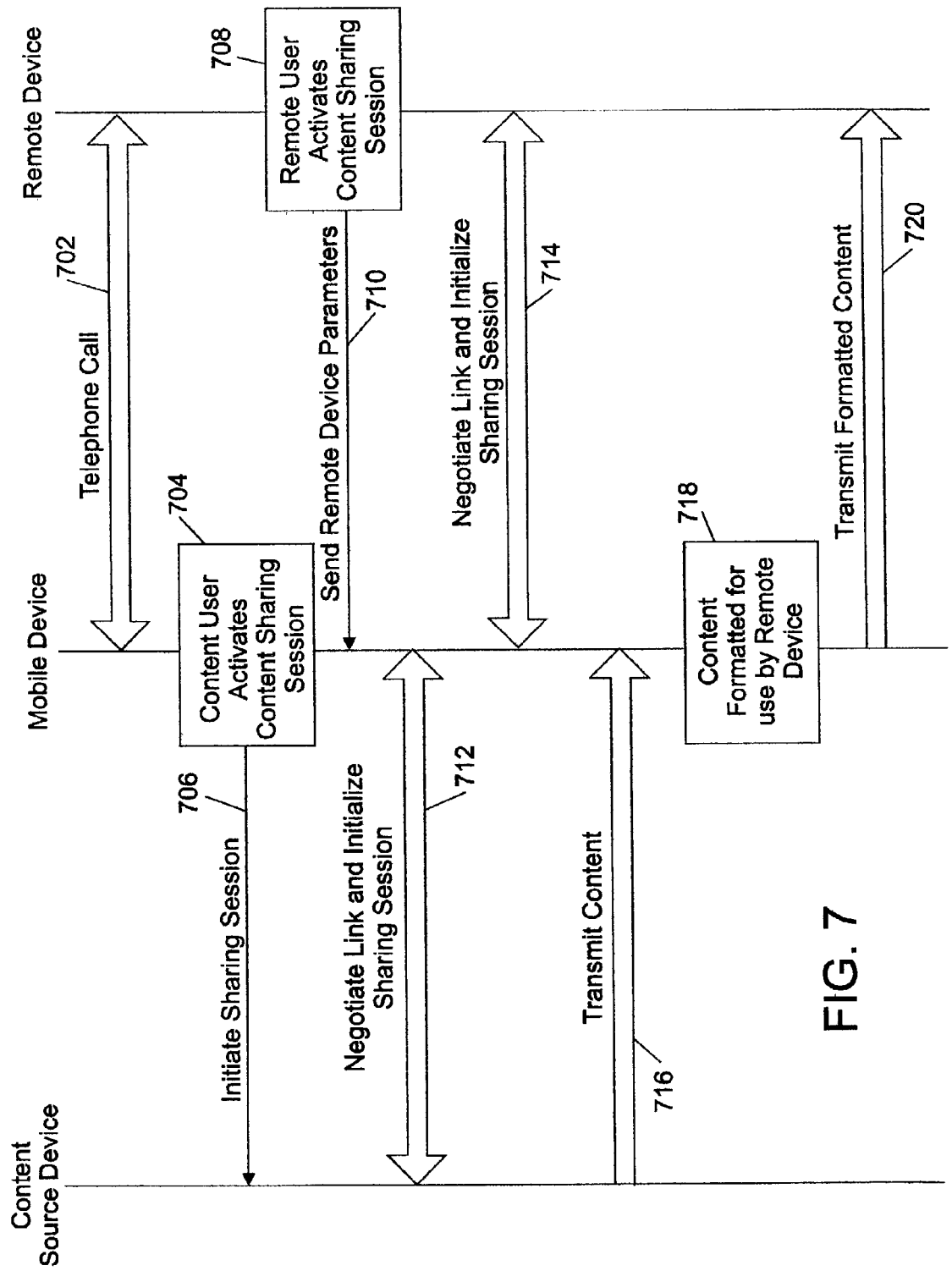
FIG. 7 is a message flow diagram that illustrates the sequence of messages when certain messaging according to one embodiment of the invention takes place.
Figure 11:
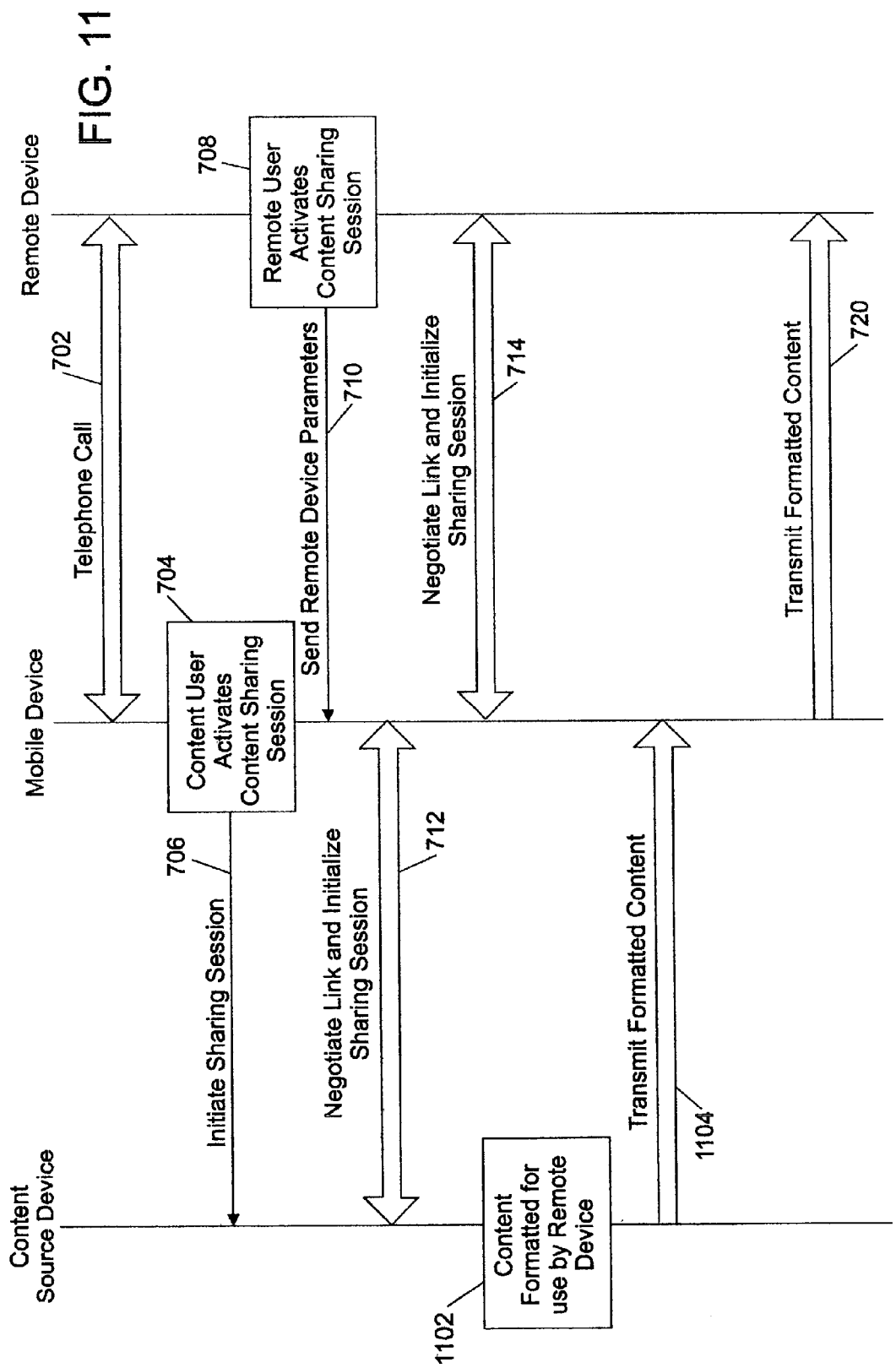
FIG. 11 illustrates another embodiment of the message flow between a content source device, a mobile device, and a remote device.
Figure 14:
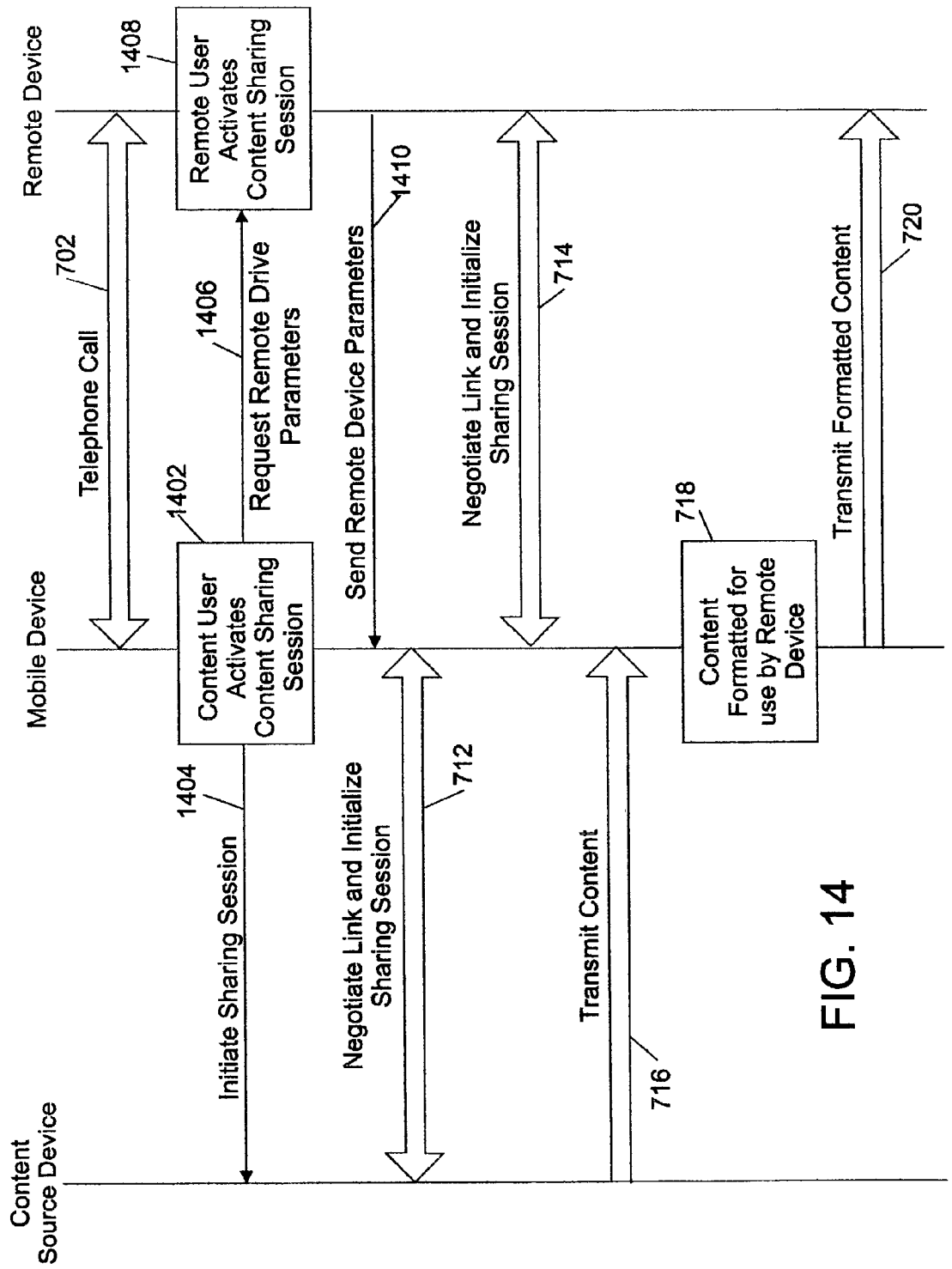
FIG. 14 illustrates another embodiment of the message flow between a content source device, a mobile device, and a remote device.

The message flow diagrams of FIGS. 7, 11, and 14 illustrate usage scenarios for the methods and apparatus described by the present invention. FIG. 7 illustrates the message flow between a content source device, a mobile device, and a remote device. The content user will have access to the content source device and the mobile device; the remote user will have access to the remote device. Initially, the content user and the remote user contact each other using some form of communication. As shown at 702 the two parties contact each other by engaging in a telephone call. The parties could also send Short Message Service (SMS) messages to each other, or they could simply agree beforehand that they were going to engage in a content sharing session at a given time. After the parties agree to initiate a content sharing session, the content user activates a content sharing session on the mobile device, 704. At that point, the mobile device initiates a sharing session with the content source device at 706. When the content user activates a content sharing session on the mobile device or shortly thereafter, the remote user activates a content sharing session on the remote device, 708. The content sharing sessions may be activated with the press of a button on the device, the choice of an option on a menu, through a voice command, or through any other similar means. Once the content sharing session is activated on the remote device, the remote device will send certain remote device parameters to the mobile device that may be necessary to format the content for use on the remote device as shown at 710.

The remote device parameters may include various remote device-specific information such as the type of device, model of the device, or various content, display, or audio processing capabilities such as screen size, refresh rate, color vs. gray-scale capabilities, G-MIDI support, etc. The type of device may be used to format the content using a look-up table that identifies the specific capabilities of the remote device. For example, a type 10 remote device may be a 1024×1024 pixel, 64 Kb, color display that supports full motion digital video and has full MIDI stereo audio.

The mobile device and content source device will next negotiate a link between the two devices and initialize a sharing session, 712. Shortly thereafter or simultaneous therewith, the mobile device and the remote device will also negotiate a link between the two devices and initialize a sharing session, 714. The content source device will next begin to transmit the content selected by the content user to the mobile device, 716. The content from the content source device will then be formatted by the mobile device using the remote device parameters previously sent by the remote device to the mobile device, 718. Once the content has been formatted for use by the remote device, it will be transmitted by the mobile device to the remote device, 720. The message flow illustrated in FIG. 7 is for illustration purposes only.

The exact timing and sequence of events necessary to implement the invention would be understood by those skilled in the art.

FIGS. 8, 9A, 9B, and 10 provide flowchart diagrams illustrating the content source device, mobile device, and remote device processes that precipitate the events shown in the message flow diagram in FIG. 7. FIG. 8 is a flowchart diagram illustrating one embodiment of the content source device process for performing the present invention. For the process shown in FIG. 8, the mobile device will format the content transmitted to the remote device. The process begins at step 802 by determining if a sharing session has been initiated. The process will stay in a loop until a sharing session is initiated. Once a sharing session has been initiated, the process continues to step 804 where the content source device will negotiate a link with the mobile device. At step 806, the content source device will determine if a successful link has been established with the mobile device. If a link has not been established, the content source device will attempt to renegotiate a link with the mobile device at step 808. The content source device will again determine if a successful link has been established with the mobile device at step 810. If the content source device is not able to negotiate a link with the mobile device, the content source device will send an error message at step 812 and end the process.

After a link has been successfully established between the content source device and the mobile device at either step 806 or 810, the process will continue to step 814 where the content source device will begin to process the content to be transmitted to the mobile device. The application software used to implement the process described in FIG. 8 may allow the user to define default parameters for a generic remote device that may be used to format the content that will be used by the remote device. The default parameters may include various display and audio processing capabilities such as screen size, refresh rate, color vs. gray-scale capabilities, G-MIDI support, etc. At step 816, the content is formatted according to the user-defined default parameters. The content is then transmitted to the mobile device at step 818.

At step 820, the content source device will determine if the content has been successfully transmitted to the mobile device. If the content has not been successfully transmitted, the content source device will attempt to retransmit the content to the mobile device at step 822. The content source device will again determine if the content has been successfully transmitted to the mobile device at step 824. If the content source device is not able to successfully transmit the content to the mobile device, the content source device will send an error message at step 812 and end the process. The content source device will continue processing, formatting, and transmitting content until the content sharing session is ended at step 826.

Note that the present invention is not limited to the embodiment of the content source device process described above. The exact process may vary depending on the content source device, the mobile device, and the remote device used. As one of ordinary skill in the telecommunications and computing arts would quickly recognize, the steps described above for the content source device process may vary, be ordered differently, or involve additional steps not disclosed herein, and that the present invention is not limited to the above process.

Figure 9A:
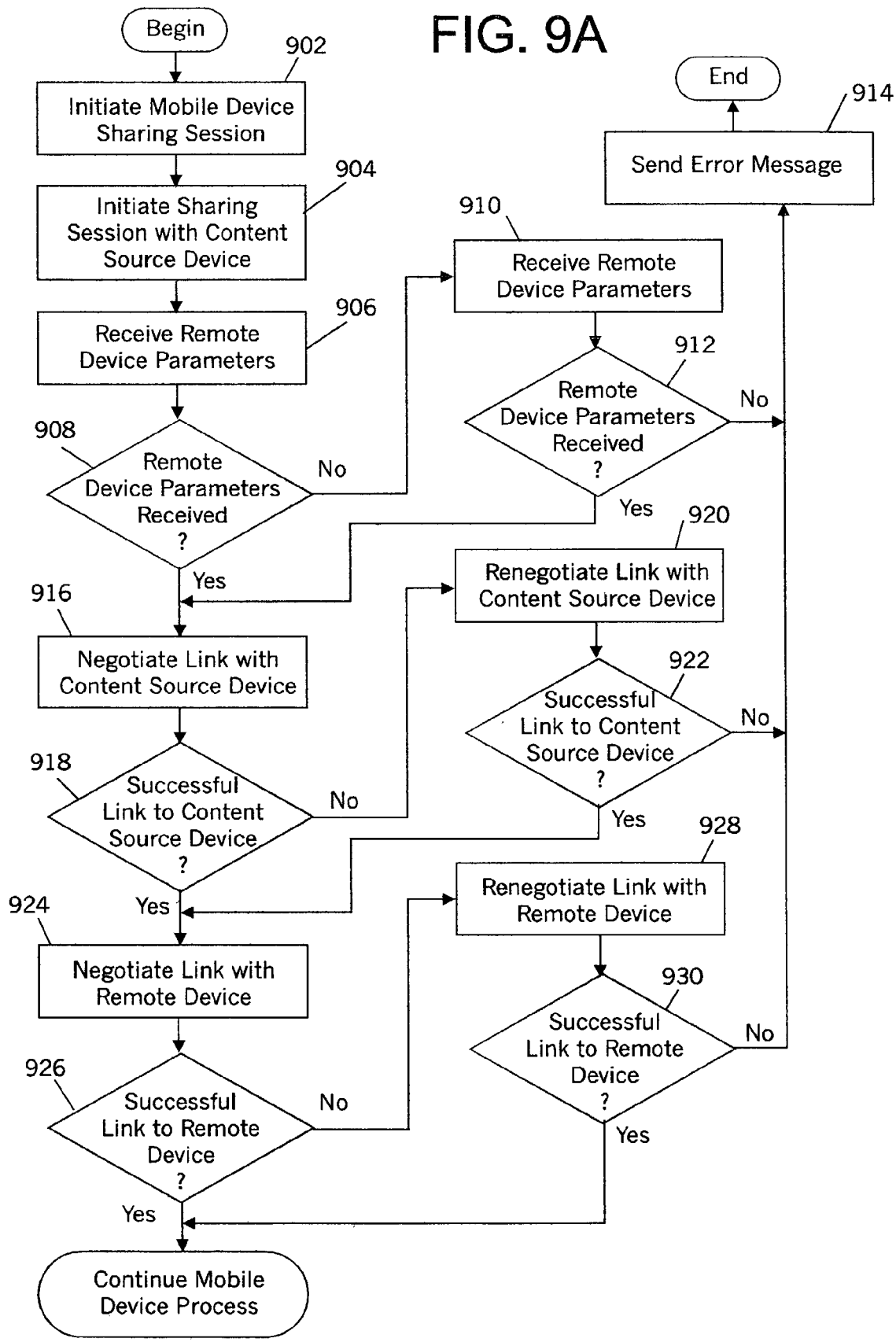
FIGS. 9A and 9B are flowchart diagrams illustrating one embodiment of the mobile device process for performing the present invention.
Figure 9B:
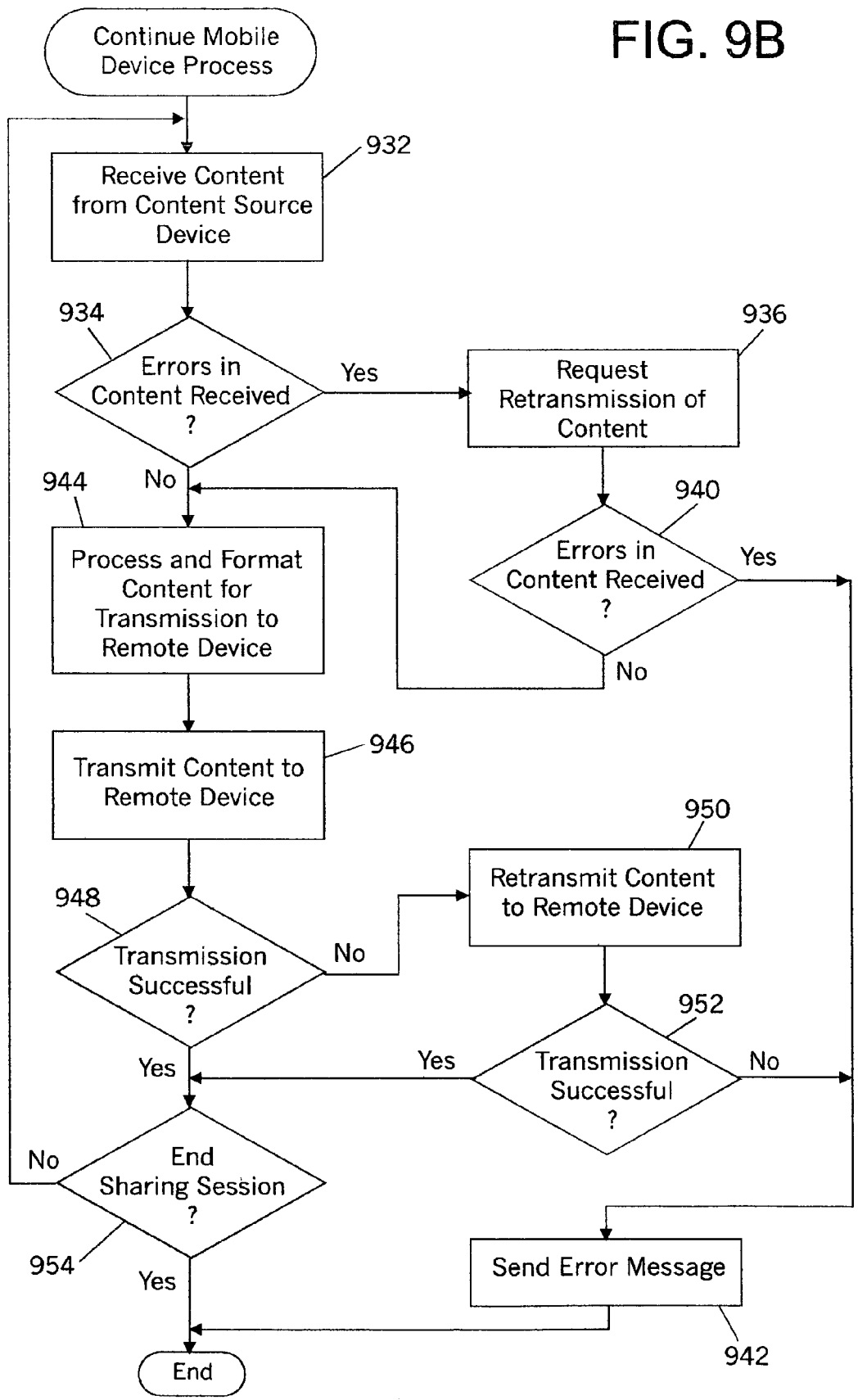

FIGS. 9A and 9B are flowchart diagrams illustrating one embodiment of the mobile device process for performing the present invention. For the process shown in FIGS. 9A and 9B, the content transmitted to the remote device will be formatted by the mobile device and the sharing session between the mobile device and the remote device will be initiated in the remote device by the remote device user. FIG. 9A illustrates the process that begins at step 902 when the mobile device sharing session is initiated. The mobile device will then initiate a sharing session with the content source device at step 904.

The mobile device will then receive the remote device parameters at step 906 that will be used by the mobile device to format the content received from the content source device for use by the remote device. At step 908, the mobile device will determine if the mobile device has received the remote device parameters. If the mobile device has not received the remote device parameters, the mobile device will attempt to receive the remote device parameters again at step 910. The mobile device will again determine at step 912 if it has received the remote device parameters. If the mobile device does not receive the remote device parameters from the remote device, the mobile device will send an error message at step 914 and end the process.

Once the mobile device receives the remote device parameters from the remote device, the process continues to step 916 where the mobile device will negotiate a link with the content source device. At step 918, the mobile device will determine if a successful link has been established with the content source device. If a link has not been established, the mobile device will attempt to renegotiate a link with the content source device at step 920. The mobile device will again determine if a successful link has been established with the content source device at step 922. If the mobile device is not able to negotiate a link with the content source device, the mobile device will send an error message at step 914 and end the process.

Once a link has been established between the mobile device and the content source device, the process continues to step 924 where the mobile device will negotiate a link with the remote device. At step 926, the mobile device will determine if a successful link has been established with the remote device. If a link has not been established, the mobile device will attempt to renegotiate a link with the remote device at step 928. The mobile device will again determine if a successful link has been established with the remote device at step 930. If the mobile device is not able to negotiate a link with the remote device, the mobile device will send an error message at step 914 and end the process. The mobile device process continues and is shown in FIG. 9B.

FIG. 9B illustrates the remainder of the mobile device process. After the mobile device has successfully established a link with both the content source device and the remote device, the process continues at step 932 where the mobile device receives content from the content source device. At step 934, the mobile device will determine if there are any errors in the content received from the content source device. The determination as to what, if any, errors may be acceptable would be understood in the art and is not intended to limit the present invention. If there are errors in the content, the mobile device will request a retransmission of some or all of the content at step 936. The mobile device will determine if there are any errors in the content after the retransmission at step 940. If the mobile device continues to receive content from the content source device with errors in the content, the mobile device will send an error message at step 942 and end the process.

After the content has been successfully received by the mobile device from the content source device, the content is next processed and formatted by the mobile device for transmission to the remote device at step 944. The mobile device may use the remote device parameters previous received from the remote device to determine how the content should be formatted. During the processing of the content, mobile device-generated content may be added to the content received from the content source device. After the content has been formatted, the content will be transmitted by the mobile device to the remote device at step 946. The mobile device may transmit any mobile device-generated content with the content received from the content source device or it may transmit it separately.

At step 948, the mobile device will determine if the content has been successfully transmitted to the remote device. If the content has not been successfully transmitted, the mobile device will attempt to retransmit the content to the remote device at step 950. The mobile device will again determine if the content has been successfully transmitted to the remote device at step 952. If the mobile device is not able to successfully transmit the content to the remote device, the mobile device will send an error message at step 942 and end the process. The mobile device will continue receiving, checking for errors, processing, formatting, and transmitting content until the content sharing session is ended at step 954.

Note that the present invention is not limited to the embodiment of mobile device process described above. The exact process may vary depending on the content source device, the mobile device, and the remote device used. As one of ordinary skill in the telecommunications and computing arts would quickly recognize, the steps described above for the mobile device process may vary, be ordered differently, or involve additional steps not disclosed herein, and that the present invention is not limited to the above process.

Figure 10:
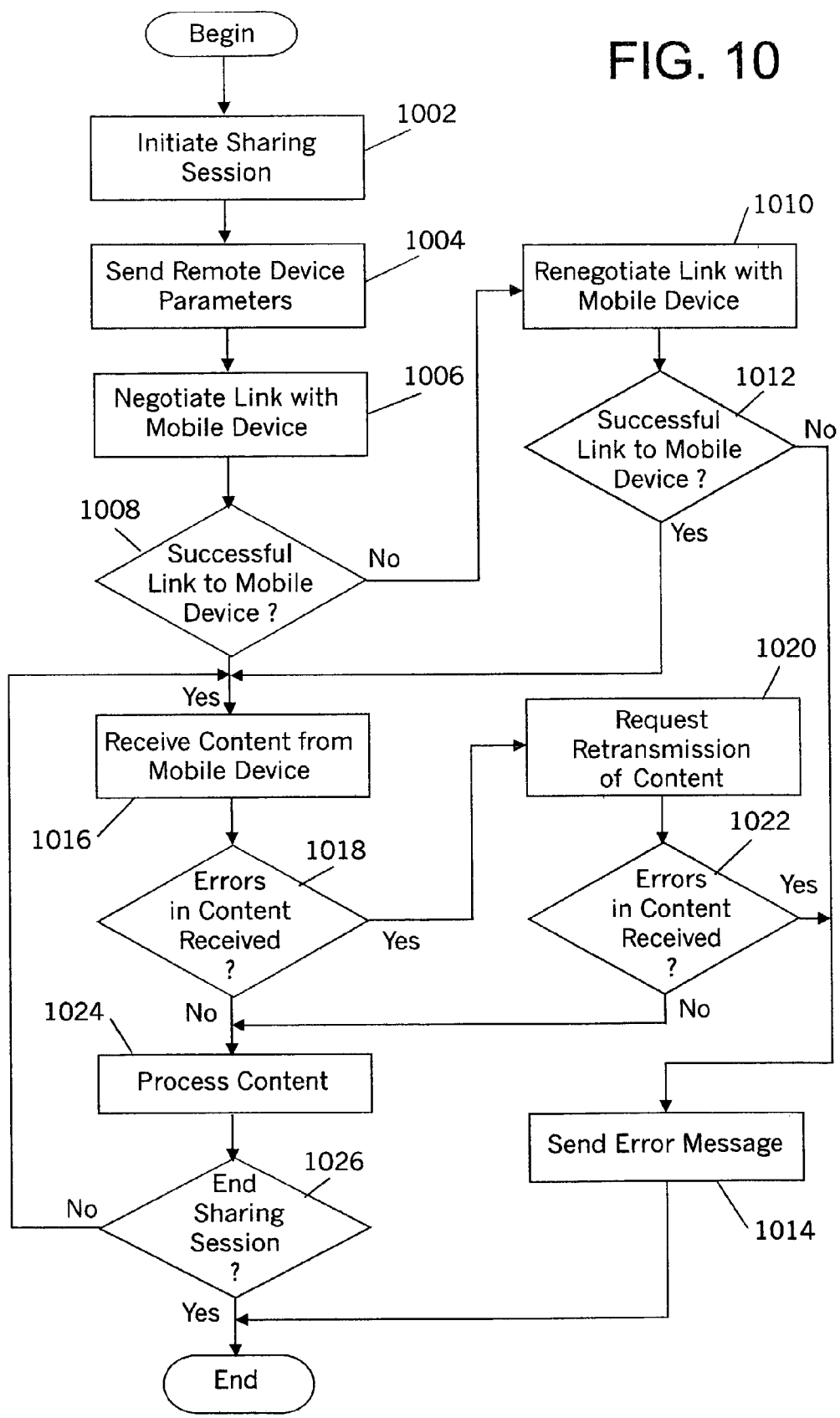
FIG. 10 is a flowchart diagram illustrating one embodiment of the remote device process for performing the present invention.

FIG. 10 is a flowchart diagram illustrating one embodiment of the remote device process for performing the present invention. For the process shown in FIG. 10, the user of the remote device initiates the sharing session in the remote device. The process begins at step 1002 where the sharing session is initiated in the remote device. Once the sharing session is initiated, the remote device attempts to send the aforementioned remote device parameters to the mobile device at step 1004.

Once the remote device transmits the remote device parameters, the process continues to step 1006 where the remote device will negotiate a link with the mobile device. At step 1008, the remote device will determine if a successful link has been established with the mobile device. If a link has not been established, the remote device will attempt to renegotiate a link with the mobile device at step 1010. The remote device will again determine if a successful link has been established with the mobile device at step 1012. If the remote device is not able to negotiate a link with the mobile device, the remote device will send an error message at step 1014 and end the process.

After the remote device has successfully established a link with the mobile device, the process continues at step 1016 where the remote device receives content from the mobile device. At step 1018, the remote device will determine if there are any errors in the content received from the mobile device. The determination as to what, if any, errors may be acceptable would be understood in the art and is not intended to limit the present invention. If there are errors in the content, the remote device will request a retransmission of some or all of the content at step 1020. The remote device will determine if there are any errors in the content after the retransmission at step 1022. If the remote device continues to receive content from the mobile device with errors in the content, the remote device will send an error message at step 1014 and end the process.

After the content has been successfully received by the remote device from the mobile device, the content is next processed by the remote device at step 1024. Processing the content may included any number of tasks such as playing music, voice, audio, video, or multimedia content; displaying web pages, images, text, or graphics; or potentially executing or downloading software instructions. The remote device will continue receiving, checking for errors, and processing content until the content sharing session is ended at step 1026.

Note that the present invention is not limited to the embodiment of remote device process described above. The exact process may vary depending on the content source device, the mobile device, and the remote device used. As one of ordinary skill in the telecommunications and computing arts would quickly recognize, the steps described above for the remote device process may vary, be ordered differently, or involve additional steps not disclosed herein, and that the present invention is not limited to the above process.

FIG. 11 illustrates another embodiment of the message flow between a content source device, a mobile device, and a remote device. The messaging shown in FIG. 11 is similar in all respects to the messaging shown and described for FIG. 7 with regard to the events at 702-714 and 720. The primary difference is that instead of the mobile device formatting the content for use by the remote device, the content is formatted at 1102 by the content source device for use by the remote device using the remote device parameters initially sent by the remote device at 710. Once the remote device parameters are received by the mobile device from the remote device, those parameters will be sent to the content source device when the link is negotiated and the sharing session is initialized at 712. After the content is formatted for use by the remote device at 1102, the content will be transmitted to the mobile device at 1104. The mobile device will then transmit the content at 720 for use by the remote device. The message flow illustrated in FIG. 11 is for illustration purposes only. The exact timing and sequence of events necessary to implement the invention would be understood by those skilled in the art.

Figure 12:
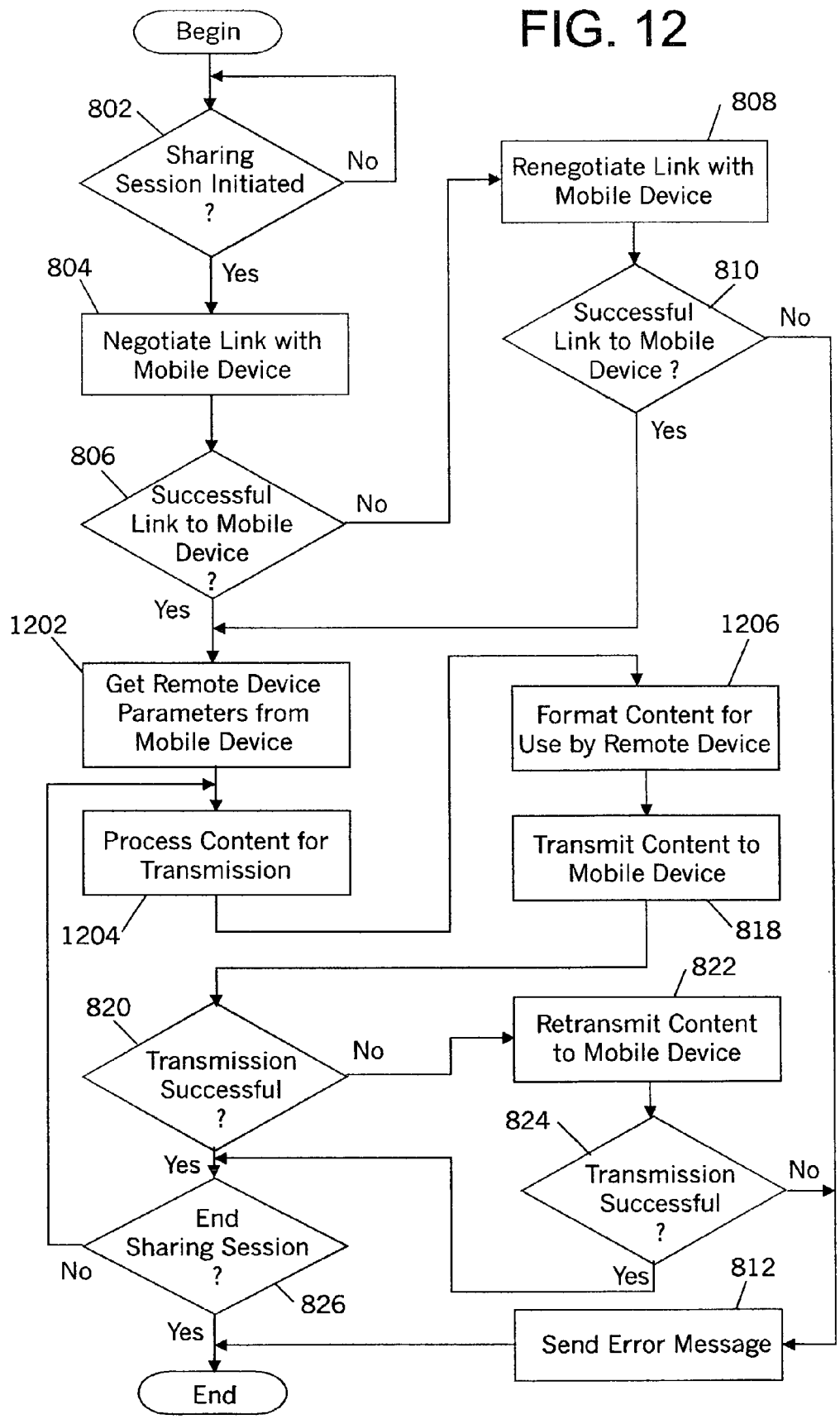
FIG. 12 is a flowchart diagram illustrating another embodiment of the content source device process for performing the present invention.

FIGS. 10, 12, 13A and 13B provide flowchart diagrams illustrating the remote device, content source device, and mobile device processes that precipitate the events shown in the message flow diagram in FIG. 11. FIG. 12 is a flowchart diagram illustrating another embodiment of the content source device process for performing the present invention. For the process shown in FIG. 12, the content transmitted to the remote device will be formatted by the content source device. The steps shown in FIG. 12 are similar in all respects to the steps shown and described for FIG. 8 with regard to steps 802-812 and 818-826. The primary difference is that instead of the mobile device formatting the content for use by the remote device, the content source device formats the content for use by the remote device. After the sharing session has been initiated and a link is established between the content source device and the mobile device, the content source device gets the remote device parameters from the mobile device at step 1202. The content will then be processed by the content source device to determine what content is to be sent to the remote device at step 1204 and then formatted by the content source device at step 1206 for use by the remote device using the remote device parameters received at step 1202. The process will then continue as in FIG. 8 by transmitting the content to the mobile device at step 818. Note that the present invention is not limited to the embodiment of content source device process described above. The exact process may vary depending on the content source device, the mobile device, and the remote device used.

Figure 13A:
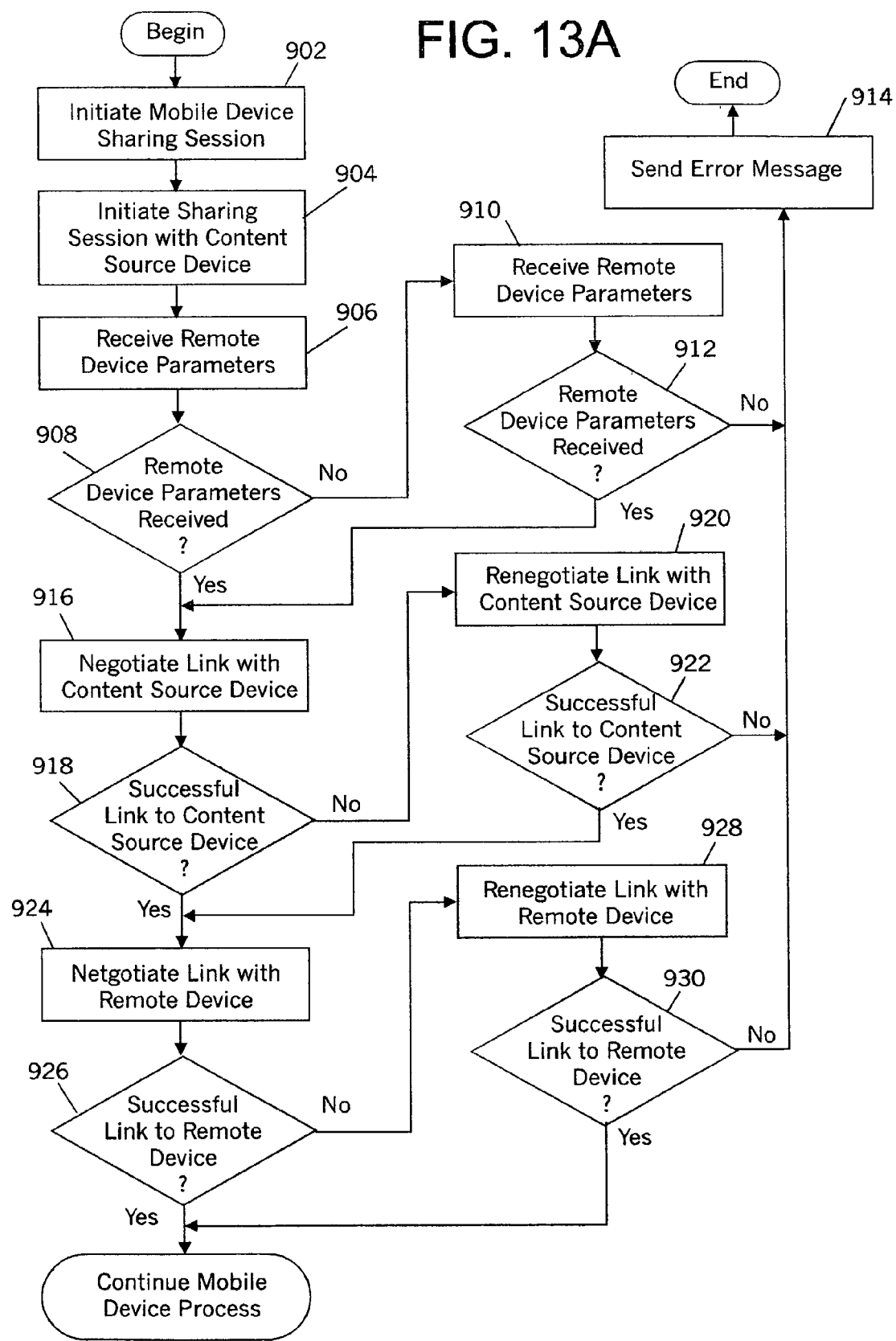
FIGS. 13A and 13B are flowchart diagrams illustrating another embodiment of the mobile device process for performing the present invention.
Figure 13B:
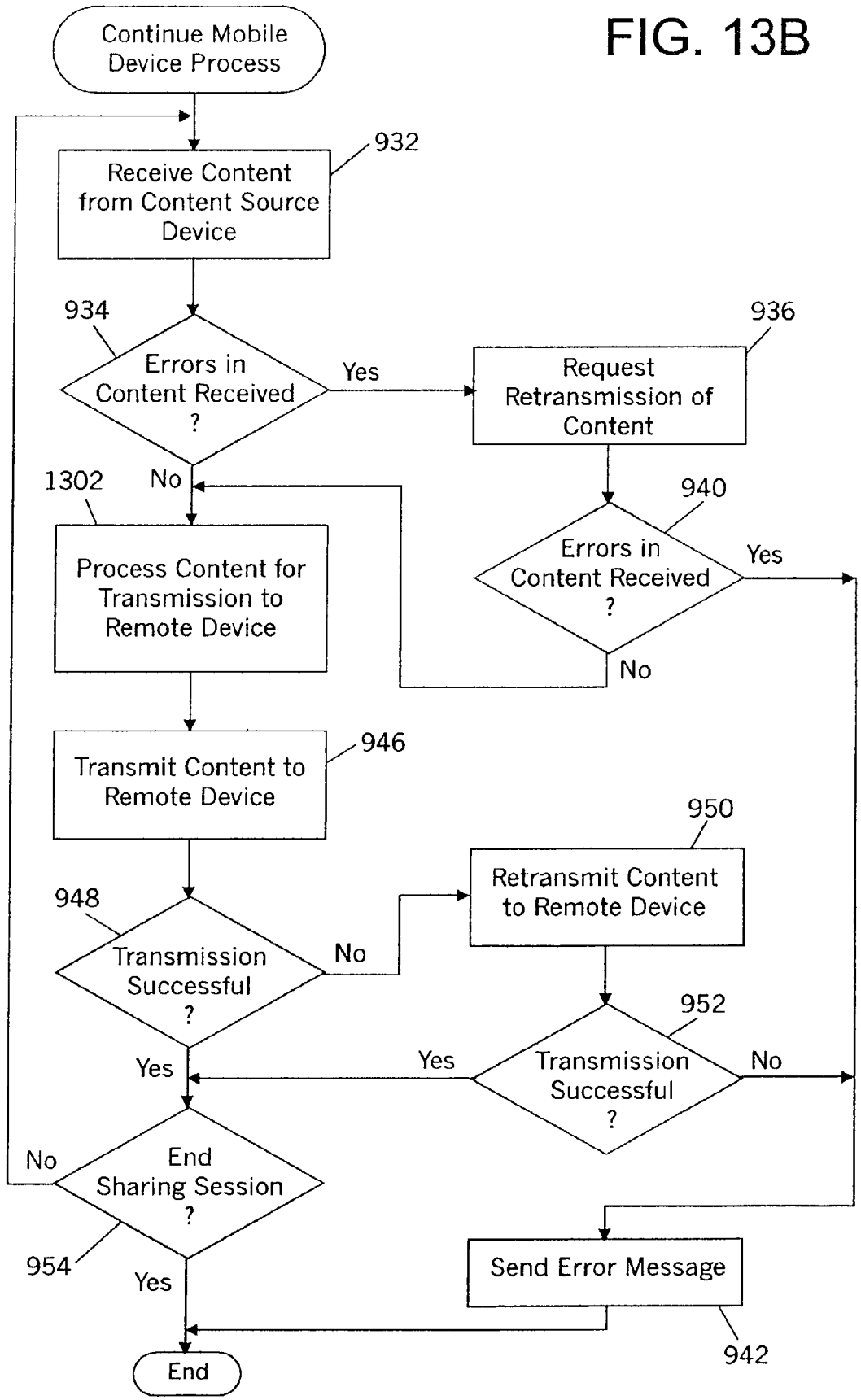

FIGS. 13A and 13B are flowchart diagrams illustrating another embodiment of the mobile device process for performing the present invention. For the process shown in FIGS. 13A and 13B, the content transmitted to the remote device will be formatted by the content source device and the sharing session between the mobile device and the remote device will be initiated in the remote device by the remote device user. The steps shown in FIGS. 13A and 13B are similar in all respects to the steps shown and described for FIGS. 9A and 9B with regard to steps 902-942 and 946-954. The primary difference is that instead of the mobile device formatting the content for use by the remote device the content source device formats the content for use by the remote device. FIG. 13A illustrates the process that begins at step 902 when the mobile device sharing session is initiated. The mobile device process continues and is shown in FIG. 13B. FIG. 13B illustrates the remainder of the mobile device process and the difference from FIG. 9B. At step 1302, the mobile device processes the content received from the content source device for transmission to the remote device and then the process continues at step 946 when the content is transmitted to the remote device. The content is formatted for use by the remote device by the content source device using the remote device parameters that are sent to the content source device at step 924 as shown in FIG. 13A. Note that the present invention is not limited to the embodiment of mobile device process described above. The exact process may vary depending on the content source device, the mobile device, and the remote device used.

FIG. 14 illustrates another embodiment of the message flow between a content source device, a mobile device, and a remote device. The messaging shown in FIG. 14 is similar in all respects to the messaging shown and described for FIG. 7 with regard to the events at 702 and 712-720. The primary difference is that the sharing session is initiated in the remote device by the mobile device. At 1402, the content user on the mobile device activates the sharing session. The mobile device then initiates a sharing session with the content source device at 1404, and then by requesting the remote device parameters, the mobile device initiates a sharing session with the remote device at 1406. The content sharing session may then be activated on the remote device by the remote user at 1408 or the sharing session may be activated automatically. After the content sharing session is activated on the remote device, the remote device will send certain remote device parameters to the mobile device that may be needed to format the content for use on the remote device as shown at 1410. The messaging will then continue as in FIG. 7 by negotiating a link between the content source device and the mobile device and initializing a sharing session at 712. The message flow illustrated in FIG. 14 is for illustration purposes only. The exact timing and sequence of events necessary to implement the invention would be understood by those skilled in the art.

Figure 15A:
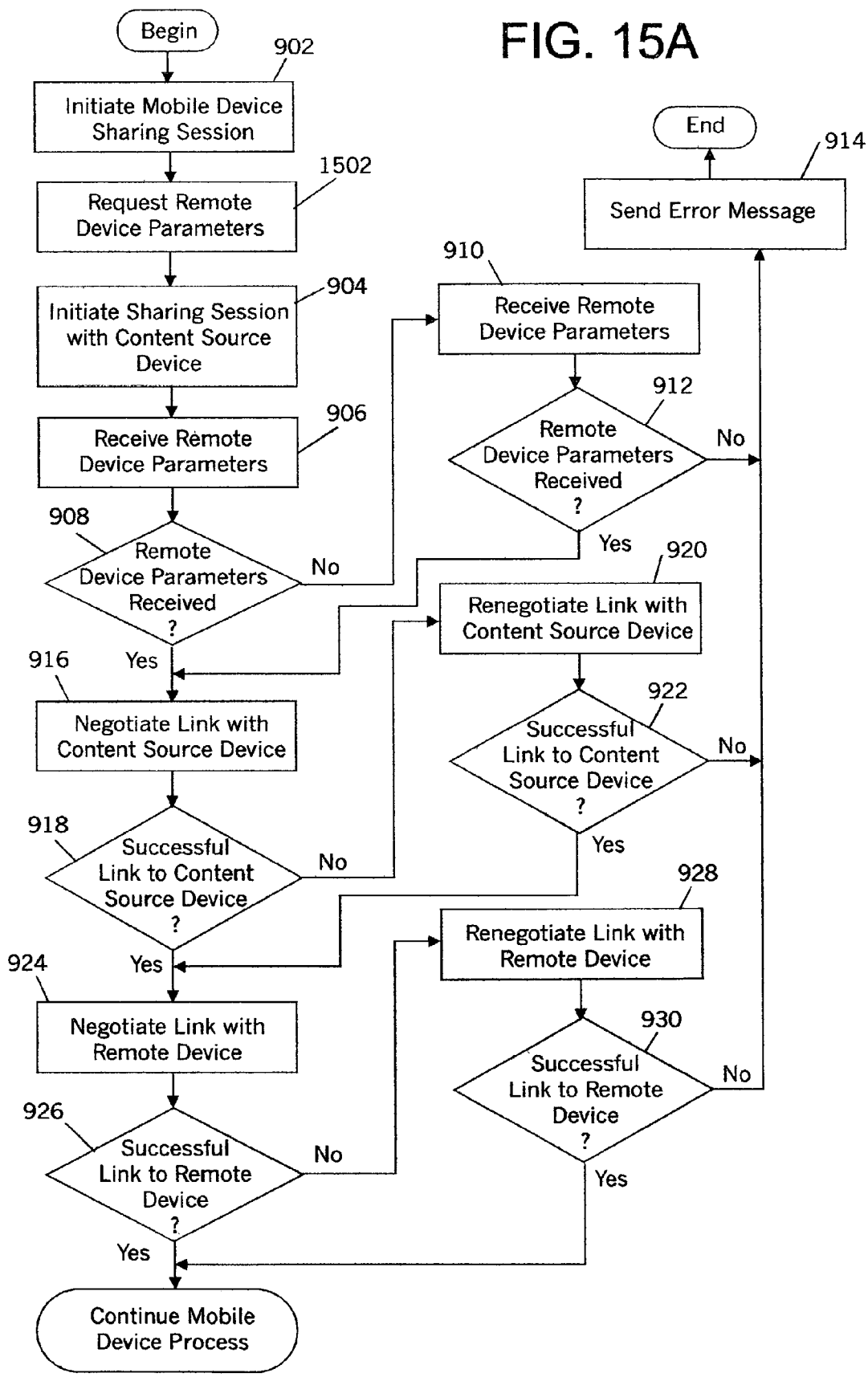
FIGS. 15A and 15B are flowchart diagrams illustrating another embodiment of the mobile device process for performing the present invention.
Figure 15B:
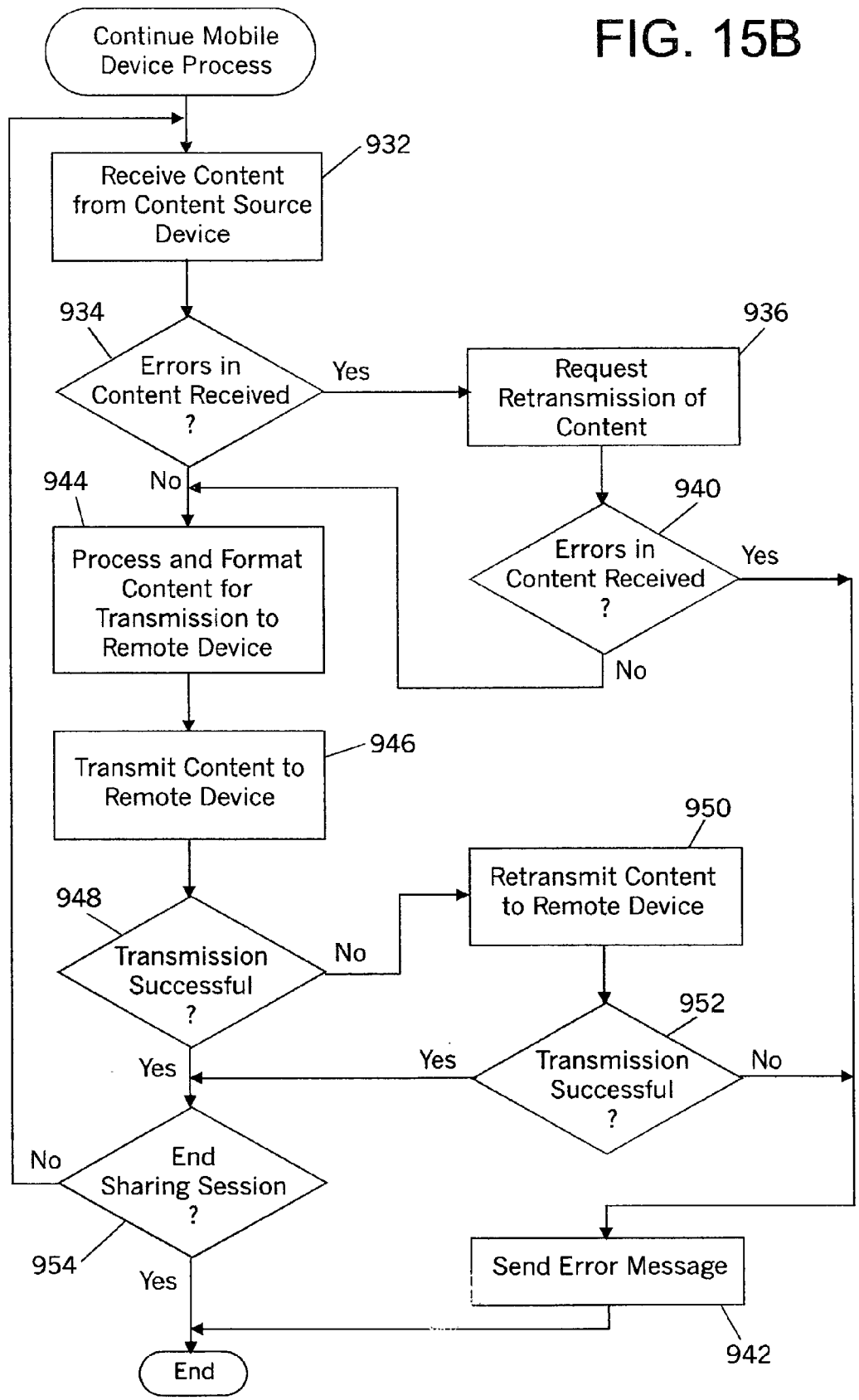

FIGS. 8, 15A, 15B, and 16 provide flowchart diagrams illustrating the content source device, mobile device, and remote device processes that precipitate the events shown in the message flow diagram in FIG. 14. FIGS. 15A and 15B are flowchart diagrams illustrating another embodiment of the mobile device process for performing the present invention. For the process shown in FIGS. 15A and 15B, the content transmitted to the remote device will be formatted by the mobile device and the sharing session between the mobile device and the remote device will be initiated by the mobile device. The steps shown in FIGS. 15A and 15B are similar in all respects to the steps shown and described for FIGS. 9A and 9B. The primary difference is that the mobile device initiates the content sharing session with remote device at step 1502 by sending a request to the remote device for remote device parameters. FIG. 15A illustrates the process that begins at step 902 when the mobile device sharing session is initiated. The mobile device process continues and is shown in FIG. 15B. FIG. 15B illustrates the remainder of the mobile device process beginning with step 932 when the mobile device receives content from the content source device and it continues from there. Note that the present invention is not limited to the embodiment of mobile device process described above. The exact process may vary depending on the content source device, the mobile device, and the remote device used.

FIG. 16 is a flowchart diagram illustrating another embodiment of the remote device process for performing the present invention. For the process shown in FIG. 16, the mobile device initiates the content sharing session. The steps shown in FIG. 16 are similar in all respects to the steps shown and described for FIG. 10 with regard to steps 1004-1026. The primary difference is that the mobile device initiates the content sharing session with remote device by sending the remote device a request for the remote device parameters. At step 1602, the remote device waits for content sharing session to be initiated by the mobile device. Once the sharing session has been initiated, the process continues to step 1004 where the remote device sends the remote device parameters to the mobile device. Note that the present invention is not limited to the embodiment of remote device process described above. The exact process may vary depending on the content source device, the mobile device, and the remote device used.

Specific embodiments of an invention are described herein. One of ordinary skill in the telecommunications and computing arts will quickly recognize that the invention has other applications in other environments. In fact, many embodiments and implementations are possible. The following claims are in no way intended to limit the scope of the invention to the specific embodiments described above.

We claim:

1. A method of sharing content using a mobile device on a wireless network, the method comprising:
    activating a content sharing session with at least one content source device and at least one remote device;
    receiving remote device parameters sent by the at least one remote device at a mobile device;
    receiving content from the at least one content source device at the mobile device;
    formatting the content received from the at least one content source device for use by the at least one remote device by the mobile device, wherein the content is formatted using the remote device parameters received from the at least one remote device; and
    transmitting the formatted content to the at least one remote device by the mobile device.

2. The method of claim 1 wherein the remote device parameters comprise a generic set of default parameters.

3. The method of claim 1 wherein the content comprises at least one of the group of data formats including web pages, images, music, voice, text, graphics, software, audio, video, and multimedia.

4. The method of claim 1 wherein the formatting of content step includes adding mobile device-generated content to the content received from the at least one content source device.

5. The method of claim 4 wherein the mobile device-generated content is voice.

6. The method of claim 1 further comprising receiving remote device-generated content from the at least one remote device.

7. The method of claim 1 further comprising transmitting at least one of the mobile device-generated content and remote device-generated content to the at least one content source device.

8. The method of claim 1 wherein the mobile device is integrated into the at least one content source device.

9. The method of claim 1 wherein the content sharing session between the mobile device and the at least one content source device is established using a short range, wireless connection.

10. Apparatus for sharing content using a wireless network, the apparatus comprising:
    means for activating a content sharing session with at least one content source device and at least one remote device;
    means for receiving remote device parameters sent by the at least one remote device;
    means for receiving content from the at least one content source device;
    means for formatting the content received from the at least one content source device for use by the at least one remote device, wherein the content is formatted using the remote device parameters received from the at least one remote device; and
    means for transmitting the formatted content to the at least one remote device.

11. The apparatus of claim 10 further comprising means for receiving remote device-generated content from the at least one remote device.

12. The apparatus of claim 10 further comprising means for transmitting at least one of the mobile device-generated content and remote device-generated content to the at least one content source device.

13. The apparatus of claim 10 wherein the apparatus is integrated into the at least one content source device.

14. A mobile device for sharing content using a wireless network, the mobile comprising:
    a user interface operable to receive user input and provide information; and
    a processing platform operably connected to the user interface operable, through use of instructions, to enable the activation of a content sharing session with at least one content source device and at least one remote device, receiving remote device parameters sent by the at least one remote device, receiving content from the at least one content source device, formatting the content received from the at least one content source device for use by the at least one remote device, wherein the content is formatted using the remote device parameters received from the at least one remote device, and transmitting the formatted content to the at least one remote device.

15. The mobile device of claim 14 wherein the remote device parameters comprise a generic set of default parameters.

16. The mobile device of claim 14 wherein the content comprises at least one of the group of data formats including web pages, images, music, voice, text, graphics, software, audio, video, and multimedia.

17. The mobile device of claim 14 wherein the formatting of content includes adding mobile device-generated content to the content received from the at least one content source device.

18. The mobile device of claim 17 wherein the mobile device-generated content is voice.

19. The mobile device of claim 14 wherein the processing platform further comprises instructions to receive remote device-generated content from the at least one remote device.

20. The mobile device of claim 14 wherein the processing platform further comprises instructions to transmit at least one of the mobile device-generated content and remote device-generated content to the at least one content source device.

21. The mobile device of claim 14 wherein the mobile device is integrated into the at least one content source device.

22. The mobile device of claim 14 wherein the content sharing session between the mobile device and the at least one content source device is established using a short range, wireless connection.

23. A method of sharing content using a mobile device on a wireless network, the method comprising:
activating a content sharing session with at least one content source device and at least one remote device by the mobile device;
receiving formatted content from the at least one content source device at the mobile device, wherein the content has been formatted by the at least one content source device for use by the at least one remote device using remote device parameters sent by the at least one remote device; and
transmitting the formatted content to the at least one remote device by the mobile device.

24. The method of claim 23 further comprising receiving the remote device parameters transmitted by the at least one remote device and transmitting the remote device parameters to the at least one content source device.

25. The method of claim 23 wherein the remote device parameters comprise a generic set of default parameters.

26. The method of claim 23 wherein the content comprises at least one of the group of data formats including web pages, images, music, voice, text, graphics, software, audio, video, and multimedia.

27. The method of claim 23 further comprising processing the formatted content received from the at least one content source device by adding mobile device-generated content to the formatted content.

28. The method of claim 27 wherein the mobile device-generated content is voice.

29. The method of claim 23 further comprising receiving remote device-generated content from the at least one remote device.

30. The method of claim 23 further comprising transmitting at least one of the mobile device-generated content and remote device-generated content to the at least one content source device.

31. The method of claim 23 wherein the mobile device is integrated into the at least one content source device.

32. The method of claim 23 wherein the content sharing session between the mobile device and the at least one content source device is established using a short range, wireless connection.

33. Apparatus for sharing content using a wireless network, the apparatus comprising:
means for activating a content sharing session with at least one content source device and at least one remote device;
means for receiving formatted content from the at least one content source device, wherein the content has been formatted by the at least one content source device for use by the at least one remote device using remote device parameters sent by the at least one remote device; and
means for transmitting the formatted content to the at least one remote device.

34. The apparatus of claim 33 further comprising means for receiving the remote device parameters transmitted by the at least one remote device and for transmitting the remote device parameters to the at least one content source device.

35. The apparatus of claim 33 further comprising means for processing the formatted content received from the at least one content source device by adding apparatus-generated content to the formatted content.

36. The apparatus of claim 35 wherein the apparatus-generated content is voice.

37. The apparatus of claim 33 further comprising means for receiving remote device-generated content from the at least one remote device.

38. The apparatus of claim 33 further comprising means for transmitting at least one of the apparatus-generated content and remote device-generated content to the at least one content source device.

39. The apparatus of claim 33 wherein the apparatus is integrated into the at least one content source device.

40. A mobile device for sharing content using a wireless network, the mobile device comprising:
a user interface operable to receive user input and provide information; and
a processing platform operably connected to the user interface operable, through use of instructions, to enable the activation of a content sharing session with at least one content source device and at least one remote device, receiving formatted content from the at least one content source device, wherein the content has been formatted by the at least one content source device for use by the at least one remote device using remote device parameters sent by the at least one remote device, and transmitting the formatted content to the at least one remote device.

41. The mobile device of claim 40 wherein the processing platform further comprises instructions to receive the remote device parameters transmitted by the at least one remote device and transmitting the remote device parameters to the at least one content source device.

42. The mobile device of claim 40 wherein the remote device parameters comprise a generic set of default parameters.

43. The mobile device of claim 40 wherein the content comprises at least one of the group of data formats including web pages, images, music, voice, text, graphics, software, audio, video, and multimedia.

44. The mobile device of claim 40 wherein the processing platform further comprises instructions to process the formatted content received from the at least one content source device by adding mobile device-generated content to the formatted content.

45. The mobile device of claim 44 wherein the mobile device-generated content is voice.

46. The mobile device of claim 40 wherein the processing platform further comprises instructions to receive remote device-generated content from the at least one remote device.

47. The mobile device of claim 40 wherein the processing platform further comprises instructions to transmit at least one of the mobile device-generated content and remote device-generated content to the at least one content source device.

48. The mobile device of claim 40 wherein the mobile device is integrated into the at least one content source device.

49. The mobile device of claim 40 wherein the content sharing session between the mobile device and the at least one content source device is established using a short range, wireless connection.

50. A method of sharing content using a remote device on a wireless network, the method comprising:
    activating a content sharing session with a mobile device
    transmitting remote device parameters to the mobile device; and
    receiving content from at least one content source device via the mobile device, wherein the content has been formatted for use by the remote device using the remote device parameters transmitted by the remote device.

51. The method of claim 50 wherein the remote device parameters comprise a generic set of default parameters.

52. The method of claim 50 wherein the content comprises at least one of the group of data formats including web pages, images, music, voice, text, graphics, software, audio, video, and multimedia.

53. The method of claim 50 wherein the content received via the mobile device includes mobile device-generated content.

54. The method of claim 53 wherein the mobile device-generated content is voice.

55. The method of claim 50 further comprising transmitting remote device-generated content to the mobile device.

56. Apparatus for sharing content using a wireless network, the apparatus comprising:
    means for activating a content sharing session with a mobile device;
    means for transmitting apparatus parameters to the mobile device; and
    means for receiving content from at least one content source device via the mobile device, wherein the content has been formatted for use by the apparatus using the apparatus parameters transmitted by the apparatus.

57. The apparatus of claim 56 further comprising means for receiving mobile device-generated content.

58. The apparatus of claim 57 wherein the mobile device-generated content is voice.

59. The apparatus of claim 56 further comprising means for transmitting apparatus-generated content to the mobile device.

60. A remote device for sharing content using a wireless network, the remote device comprising:
    a user interface operable to receive user input and provide information; and
    a processing platform operably connected to the user interface operable, through use of instructions, to enable the activation of a content sharing session with a mobile device, transmitting remote device parameters to the mobile device, and receiving content from at least one content source device via the mobile device, wherein the content has been formatted for use by the remote device using the remote device parameters transmitted by the remote device.

61. The remote device of claim 60 wherein the remote device parameters comprise a generic set of default parameters.

62. The remote device of claim 60 wherein the content comprises at least one of the group of data formats including web pages, images, music, voice, text, graphics, software, audio, video, and multimedia.

63. The remote device of claim 60 wherein the content received via the mobile device includes mobile device-generated content.

64. The remote device of claim 63 wherein the mobile device-generated content is voice.

65. The remote device of claim of claim 60 wherein the processing platform further comprises instructions to transmit remote device-generated content to the mobile device.

66. A method of sharing content using a content source device, the method comprising:
    initiating a content sharing session with a mobile device;
    receiving remote device parameters sent by at least one remote device;
    formatting content available on the content source device for use by the at least one remote device, wherein the content is formatted using the remote device parameters received from the at least one remote device; and
    transmitting the formatted content to the mobile device.

67. The method of claim 66 wherein the remote device parameters comprise a generic set of default parameters.

68. The method of claim 66 wherein the content comprises at least one of the group of data formats including web pages, images, music, voice, text, graphics, software, audio, video, and multimedia.

69. The method of claim 66 further comprising receiving at least one of the mobile device-generated content and remote device-generated content from the mobile device.

70. The method of claim 66 wherein the mobile device is integrated into the at least one content source device.

71. The method of claim 66 wherein the content sharing session between the mobile device and the at least one content source device is established using a short range, wireless connection.

72. Apparatus for sharing content using a wireless network, the apparatus comprising:
    means for initiating a content sharing session with a mobile device;
    means for receiving remote device parameters sent by at least one remote device;
    means for formatting content available on the apparatus for use by the at least one remote device, wherein the content is formatted using the remote device parameters received from the at least one remote device; and
    means for transmitting the formatted content to the mobile device.

73. The apparatus of claim 72 further comprising means for receiving at least one of the mobile device-generated content and remote device-generated content from the mobile device.

74. The apparatus of claim 72 wherein the mobile device is integrated into the apparatus.

75. A content source device for sharing content using a wireless network, the content source device comprising:
    a user interface operable to receive user input; and
    a processing platform operably connected to the user interface operable, through use of instructions, to enable the initiation of a content sharing session with a mobile device, receiving remote device parameters sent by at least one remote device, formatting content available on the content source device for use by the at least one remote device, wherein the content is formatted using the remote device parameters received from the at least one remote device, and transmitting the formatted content to the mobile device.

76. The content source device of claim 75 wherein the remote device parameters comprise a generic set of default parameters.

77. The content source device of claim 75 wherein the content comprises at least one of the group of data formats including web pages, images, music, voice, text, graphics, software, audio, video, and multimedia.

78. The content source device of claim 75 wherein the processing platform is further operable to receive at least one of the mobile device-generated content and remote device-generated content from the mobile device.

79. The content source device of claim 75 wherein the mobile device is integrated into the content source device.

80. The content source device of claim 75 wherein the content sharing session between the mobile device and the content source device is established using a short range, wireless connection.

81. A method of sharing content using a wireless network, the method comprising:

activating a content sharing session between a mobile device and at least one content source device;

activating a content sharing session between a mobile device and at least one remote device;

formatting content for use by the at least one remote device by the mobile device using remote device parameters sent by the at least one remote device;

transmitting content from the at least one content source device to the mobile device; and transmitting the formatted content from the mobile device to the at least one remote device.

82. The method of claim 81 wherein the content transmitted by the mobile device to the at least one remote device includes content from the content source device and content generated by the mobile device.

83. The method of claim 81 further comprising transmitting remote device-generated content from the at least one remote device to at least one of the mobile device and the at least one content source device.

84. The method of claim 81 further comprising transmitting mobile device-generated content from the mobile device to the at least one content source device.

* * * * *